United States Patent
Takemura et al.

(10) Patent No.: US 9,086,595 B2
(45) Date of Patent: Jul. 21, 2015

(54) SURFACE LIGHT SOURCE DEVICE, LIQUID CRYSTAL DISPLAY DEVICE, AND MOBILE DEVICE

(71) Applicant: OMRON Corporation, Kyoto (JP)

(72) Inventors: Koichi Takemura, Shiga (JP); Takashi Sato, Tokyo (JP); Masanori Mori, Saitama (JP); Akira Nagao, Tokyo (JP); Tetsuo Hayashi, Saitama (JP); Kazuhide Hirota, Shiga (JP); Gouo Kurata, Saitama (JP)

(73) Assignee: OMRON Corporation, Kyoto (JP)

( * ) Notice: Subject to any disclaimer, the term of this patent is extended or adjusted under 35 U.S.C. 154(b) by 219 days.

(21) Appl. No.: 13/762,712

(22) Filed: Feb. 8, 2013

(65) Prior Publication Data

US 2014/0111743 A1    Apr. 24, 2014

(30) Foreign Application Priority Data

Oct. 18, 2012    (JP) .................................. 2012-231232

(51) Int. Cl.
| | |
|---|---|
| *G02F 1/1335* | (2006.01) |
| *F21V 8/00* | (2006.01) |
| *F21S 2/00* | (2006.01) |
| *F21S 8/00* | (2006.01) |
| *F21V 1/00* | (2006.01) |
| *F21V 17/00* | (2006.01) |

(52) U.S. Cl.
CPC .............. *G02F 1/133606* (2013.01); *F21S 2/00* (2013.01); *F21S 8/00* (2013.01); *F21V 1/00* (2013.01); *F21V 17/00* (2013.01); *G02B 6/0011* (2013.01)

(58) Field of Classification Search
CPC ...... F21S 2/00; G02B 6/0011; G02F 1/133606
USPC ............. 349/65; 362/606, 611, 607, 608, 619
See application file for complete search history.

(56) References Cited

U.S. PATENT DOCUMENTS

| | | | | |
|---|---|---|---|---|
| 6,650,382 | B1 * | 11/2003 | Sumida et al. ................... | 349/63 |
| 2008/0043171 | A1 * | 2/2008 | Takahashi et al. .............. | 349/65 |

(Continued)

FOREIGN PATENT DOCUMENTS

| | | |
|---|---|---|
| JP | 2006093015 A | 4/2006 |
| JP | 2010-040434 A | 2/2010 |

(Continued)

OTHER PUBLICATIONS

Office Action issued in corresponding Japanese Application No. 2014-032315, mailed Oct. 21, 2014 (14 pages).

(Continued)

*Primary Examiner* — Sang V Nguyen
(74) *Attorney, Agent, or Firm* — Osha Liang LLP

(57) ABSTRACT

An area light source device has a light guide plate having an end face and a light exit surface, a light source that is disposed in a position facing the end face of the light guide plate, a plurality of optical sheets that are disposed on the light guide plate, a light shielding plate that is disposed so as to cover an upper portion of the light source, and a light blocking member that is provided between the end face of the light guide plate and the light exit surface. The end face of the light guide plate is configured to have light introduced therethrough. The light exit surface of the light guide plate is configured to output the light from the light guide plate. The light blocking member is different from the light shielding plate.

19 Claims, 33 Drawing Sheets

(56) References Cited

U.S. PATENT DOCUMENTS

| | | | |
|---|---|---|---|
| 2010/0195019 A1* | 8/2010 | Shinohara et al. | 349/62 |
| 2010/0315833 A1* | 12/2010 | Holman et al. | 362/607 |
| 2011/0058121 A1* | 3/2011 | Yabe | 349/62 |
| 2011/0170036 A1* | 7/2011 | Ishikawa et al. | 349/65 |
| 2011/0286237 A1* | 11/2011 | Tanoue et al. | 362/606 |
| 2012/0002437 A1* | 1/2012 | Yabe et al. | 362/606 |
| 2012/0002441 A1* | 1/2012 | Yabe et al. | 362/607 |
| 2012/0224120 A1* | 9/2012 | Koyama | 349/62 |
| 2013/0033898 A1* | 2/2013 | Kunimochi | 362/611 |
| 2014/0111743 A1 | 4/2014 | Takemura et al. | |

FOREIGN PATENT DOCUMENTS

| | | | | |
|---|---|---|---|---|
| JP | WO/2010/016571 | * | 2/2010 | F21S 2/00 |
| JP | 2012014909 A | | 1/2012 | |
| JP | 2012-128211 A | | 7/2012 | |
| JP | 5532104 B2 | | 6/2014 | |
| KR | 10-2009-0040621 A | | 4/2009 | |
| KR | 10-2012-0056811 A | | 6/2012 | |
| WO | 2010/070821 A1 | | 6/2010 | |

OTHER PUBLICATIONS

Office Action issued in Japanese Application No. 2012-231232, mailed on Dec. 24, 2013 and English translation thereof (7 pages).

Patent Abstracts of Japan, Publication No. 2006093015, Publication Date: Apr. 6, 2006 (1 Page).

Office Action issued in counterpart Korean Patent Application No. 10-2013-0014201 dated Jan. 17, 2014 (14 pages).

* cited by examiner

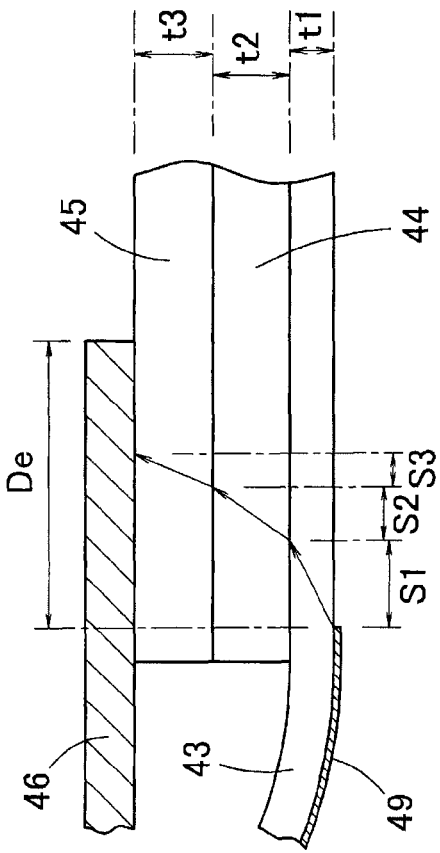
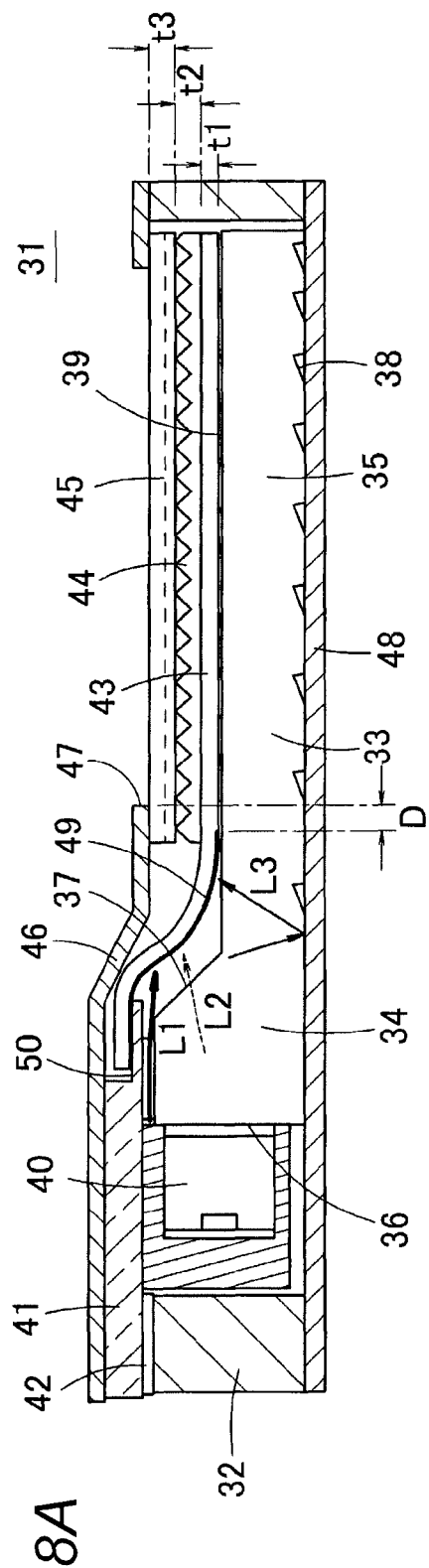
FIG. 8B
FIG. 8A

SURFACE LIGHT SOURCE DEVICE, LIQUID CRYSTAL DISPLAY DEVICE, AND MOBILE DEVICE

CROSS-REFERENCE TO RELATED APPLICATION

The present application claims priority from Japanese Patent Application No. 2012-231232, filed on Oct. 18, 2012, the subject matter of which is hereby incorporated by reference.

BACKGROUND

1. Technical Field

The present invention relates to a surface light source device, a liquid crystal display device, and a mobile device. Particularly, the present invention relates to an area light source device that can reduce light leakage in an effective emission region to enhance emission quality.

2. Related Art

FIG. 1 illustrates a section of a conventional area light source device. In an area light source device 11, a light guide plate 13 is accommodated in a frame 12, and a light source 15 is disposed while facing an end face (a light incident end face 14) of the light guide plate 13. In the light guide plate 13, a light introduction part 16 is continuously molded at an end of the light guide plate body 17. The light introduction part 16 includes an inclined surface 16a, and has a thickness greater than that of the light guide plate body 17. The light guide plate body 17 occupies most part of an area of the light guide plate 13. The light source 15 is mounted on a lower surface of a flexible printed board 18. The flexible printed board 18 is bonded to upper surfaces of the frame 12 and light introduction part 16 using an adhesive 19, thereby fixing the light source 15 to a position facing the light incident end face 14.

Three optical sheets, namely, a diffusion sheet 20 and two prism sheets 21 and 22 are stacked on the upper surface of the light guide plate body 17. A rim sheet 23 (a light shielding plate) is bonded onto the flexible printed board 18, the frame 12, and the prism sheet 22, and an effective emission region of the light guide plate body 17 is exposed from an aperture window 24 of the rim sheet 23. The effective emission region of the light guide plate 13 means a region where the light used as the light of the area light source device 11 is output, and a region where the light with which the liquid crystal display panel is irradiated is output (usually a region except the effective emission region is covered with a rim sheet such that the light is not output from the area light source device). A reflecting sheet 25 is provided on the lower surface of the light guide plate 13.

In the area light source device 11, the light emitted from the light source 15 is incident to the light introduction part 16 through the light incident end face 14 located at the substantially same level as the light source 15. The light incident to the light introduction part 16 is reflected by the lower surface of the light introduction part 16 and the inclined surface 16a, thereby introducing the light to the thin light guide plate body 17. Therefore, in the area light source device 11, the light of the light introduction part 16 is efficiently incident to the light guide plate 13 to irradiate the effective emission region of the light guide plate 13 with high luminance, and a low profile of the area light source device 11 can be achieved.

However, in the area light source device 11 having the structure in FIG. 1, the light leaks easily from the aperture window 24 of the rim sheet 23 through three main routes. First leakage light is light L1 that leaks directly from the light source 15. That is, the light L1 is not incident to the light guide plate 13, but incident to an end face of an optical sheet through the transparent adhesive 19 that bonds the flexible printed board 18 to the light introduction part 16. Second leakage light is light L2 that leaks from the inclined surface 16a of the light introduction part 16. That is, the light L2 is incident to the light introduction part 16 through the light incident end face 14, directly output to the outside through the inclined surface 16a, and incident to the end face of the optical sheet. Third leakage light is light L3, which is reflected downward by the inclined surface 16a, is further reflected by the reflecting sheet 25, leaks from the upper surface of the light guide plate body 17, and is incident to the end face or lower surface of the optical sheet.

The light L1, the light L2, and the light L3 are not the light, which is guided in the light guide plate body 17 and output from the effective emission region, namely, the controlled light. Therefore, the effective emission region is unevenly irradiated near the light source 15 with the light L1, the light L2, and the light L3 to degrade visual quality. For example, when light A in FIG. 2 leaks in front of the light source 15 through an edge of the aperture window 24, eyespot luminescence P emerges at the edge of the effective emission region as illustrated in FIG. 3, thereby losing evenness of luminance in the effective emission region. For example, light B in FIG. 2 is incident to the optical sheet through the end face of the optical sheet, and leaks gradually while reflected in the optical sheet. Therefore, a bright line Q is generated in front of the light source 15 as illustrated in FIG. 4 to lose the evenness of the luminance in the effective emission region.

As illustrated in FIG. 5, there is a method for extending the diffusion sheet 20 onto the side of the light introduction part 16 (for example, see Japanese Unexamined Patent Publication No. 2006-93015). When the diffusion sheet 20 is extended onto the side of the light introduction part 16 to cover the inclined surface 16a with the diffusion sheet 20, the light L2 leaking from the inclined surface 16a is diffused by the diffusion sheet 20, so that the light leaking unevenly from a neighborhood of the light source 15 can be decreased. However, the method cannot solve the eyespot luminescence P in FIG. 3 caused by the leakage light.

As illustrated in FIG. 6, there is a method for extending the prism sheet 21 onto the side of the light introduction part 16 (for example, see Japanese Unexamined Patent Publication No. 2012-14909). According to the method, the light L2, which is output from the inclined surface 16a of the light introduction part 16 is incident to the optical sheet and leaks gradually from the optical sheet, can be absorbed by the rim sheet 23 to prevent the generation of the bright line Q. However, in the method, it is necessary that the rim sheet 23 have a sufficient length (a distance to the edge of the aperture window 24) DS, which is measured from the end of the prism sheet 21. An effect is not obtained when the distance DS is short. Therefore, the effective emission region of the area light source device is easy to narrow. Additionally, the method has no effect on the light L1 leaking directly from the light source 15, and the leakage light L1 leaks from the edge of the aperture window 24 to generate the eyespot luminescence P.

SUMMARY

One or more embodiments of the present invention suppresses the eyespot luminescence and the bright line, which are generated at the edge of the aperture window of the rim sheet (the light shielding plate) by the leakage light.

In accordance with one or more embodiments of the present invention, an area light source device includes: a light guide plate that introduces light through an end face to output the light through a light exit surface; a light source that is disposed in a position facing the end face of the light guide plate; plural optical sheets that are disposed on the light guide plate; a light shielding plate that is disposed so as to cover an upper portion of the light source; and a light blocking member that is provided between the end face of the light guide plate and the light exit surface, the light blocking member being different from the light shielding plate.

In an area light source device in accordance with one or more embodiments of the present invention, the light blocking member is provided between the end face of the light guide plate and a light-exit-surface-side end edge of a portion covering the light source in the light shielding plate below the light shielding plate.

As used herein, the light blocking member means a member that can prevent unintended light from leaking from the area light source device by absorbing or reflecting the light.

In an area light source device in accordance with one or more embodiments of the present invention, the following condition is satisfied, $$De \geq \sum_{i=1}^{n} ti \times \tan[\arcsin(1/Ni)] \quad \text{(condition 1)}$$

(a summation of a right side is calculated for i from 1 to n, and n is the number of optical sheets)

where De is a distance between an end on a side farther away from the light source of the light blocking member and a light-exit-surface-side end edge of a portion covering the light source in the light shielding plate in a direction parallel to the light exit surface, ti is a thickness of the optical sheet located at an ith position from a bottom, and Ni is a refractive index of the optical sheet at the ith position from the bottom.

In accordance with one or more embodiments of the present invention, an area light source device comprising: a light guide plate that introduces light through an end face to output the light through a light exit surface; a light source that is disposed in a position facing the end face of the light guide plate; plural optical sheets that are disposed on the light guide plate; and a light blocking member that is provided between the end face of the light guide plate and the light exit surface, wherein the following condition is satisfied, $$Da \geq \sum_{i=1}^{n} ti \times \tan[\arcsin(1/Ni)] + tm \times \tan[\arcsin(1/Nm)] \quad \text{(condition 2)}$$

(a summation of a right side is calculated for i from 1 to n, and n is the number of optical sheets)

where Da is a distance between an end on a side farther away from the light source of the light blocking member and a display area end on a side of the light source in a display area of a liquid crystal panel disposed above the optical sheet in a direction parallel to the light exit surface, ti is a thickness of the optical sheet located at an ith position from a bottom, Ni is a refractive index of the optical sheet at the ith position from the bottom, tm is a thickness of a glass plate on a lower surface side of the liquid crystal panel, and Nm is a refractive index of the glass plate on the lower surface side of the liquid crystal panel.

In an area light source device in accordance with one or more embodiments of the present invention, the light blocking member can be configured in various ways. In an area light source device in accordance with one or more embodiments of the present invention, the light blocking member is formed in an end portion of at least one of surfaces of the optical sheet in a lowermost layer, and (1) the extended end portion of the optical sheet in the lowermost layer is fixed to a wiring board on which the light source is mounted or (2) the extended end portion of the optical sheet in the lowermost layer is fixed to the optical sheet in an uppermost layer. In an area light source device in accordance with one or more embodiments of the present invention, the light blocking member is formed in an end portion of at least one of surfaces of the optical sheet in a lowermost layer, and the extended end portion of the optical sheet in the lowermost layer is fixed to the light shielding plate.

In an area light source device in accordance with one or more embodiments of the present invention, one of end portions of the light blocking member is fixed to a wiring board on which the light source is mounted, and the other end portion of the light blocking member is fixed to the optical sheet. In an area light source device in accordance with one or more embodiments of the present invention, one of end portions of the light blocking member is fixed to the optical sheet in an uppermost layer, and the other end portion of the light blocking member is fixed to the optical sheet of a lower-layer portion. In such cases, the other end portion of the light blocking member may be bonded and fixed to the optical sheet, fixed while inserted between the optical sheets, or fixed while inserted under the optical sheet.

In an area light source device in accordance with one or more embodiments of the present invention, an end portion of the optical sheet in a lowermost layer is extended onto a side of the light source from an end of the other optical sheet, and the light blocking member is provided on an upper surface of the optical sheet in a lowermost layer. In an area light source device in accordance with one or more embodiments of the present invention, an upper surface of the light blocking member is fixed to a lower surface of the light shielding plate, or the upper surface of the light blocking member is fixed to a lower surface of a wiring board on which the light source is mounted.

In the area light source device in accordance with one or more embodiments of the present invention, the following condition is satisfied, $$De \geq \sum_{i=2}^{n} ti \times \tan[\arcsin(1/Ni)] \quad \text{(condition 3)}$$

(a summation of a right side is calculated for i from 2 to n, and n is the number of optical sheets)

where De is a distance between an end on a side farther away from the light source of the light blocking member and a light-exit-surface-side end edge of a portion covering the light source in the light shielding plate in a direction parallel to the light exit surface, ti is a thickness of the optical sheet located at an ith position from a bottom, and Ni is a refractive index of the optical sheet at the ith position from the bottom. The condition 3 is also satisfied when the condition 1 is satisfied.

In an area light source device in accordance with one or more embodiments of the present invention, an end portion of the optical sheet in a lowermost layer is extended onto a side of the light source from an end of the other optical sheet, and the light blocking member is provided on an upper surface of the optical sheet in a lowermost layer, and the following condition is satisfied, $$Da \geq \sum_{i=2}^{n} ti \times \tan[\arcsin(1/Ni)] + tm \times \tan[\arcsin(1/Nm)] \quad \text{(condition 4)}$$

(a summation of a right side is calculated for i from 2 to n, and n is the number of optical sheets)

where Da is a distance between an end on a side farther away from the light source of the light blocking member and a display area end on a side of the light source in a display area of a liquid crystal panel disposed above the optical sheet in a direction parallel to the light exit surface, ti is a thickness of the optical sheet located at an ith position from a bottom, Ni is a refractive index of the optical sheet at the ith position from the bottom, tm is a thickness of a glass plate on a lower surface side of a liquid crystal panel, and Nm is a refractive index of the glass plate on the lower surface side of the liquid crystal panel. The condition 4 is also satisfied when the condition 2 is satisfied.

In an area light source device in accordance with one or more embodiments of the present invention, the light guide plate includes: a light introduction part that confines the light incident through the end face from the light source; and a light guide plate body that is provided so as to be joined to the light introduction part, a thickness of the light guide plate body being less than a maximum thickness of the light introduction part, the light guide plate body causing a light exit part to output the confined light to an outside through a light exit surface, the light introduction part includes an inclined surface in at least one of a light-exit-side surface of the light guide plate and an opposite surface of the light-exit-side surface, the inclined surface being inclined to an end of a surface of the light guide plate body from a surface of a portion in which a thickness is greater than that of the light guide plate body, the light guide plate includes a directivity change pattern in at least one of the light-exit-side surface of the light guide plate and the opposite surface of the light-exit-side surface, the directivity change pattern changing spread of a directivity of the light incident to the light introduction part in a thickness direction of the light guide plate to a directional pattern inclined toward a direction parallel to a planar direction of the light guide plate, the directivity change pattern is configured such that a ridge line and a valley line are alternately repeated along a width direction of the light guide plate, and among a section of the directivity change pattern, which is cut in parallel with the end face, in a portion, which is located in front of the light source and in a region having a width equal to that of the light source, a slope connecting any one of ridge lines of the directivity change pattern and one of valley lines adjacent to the ridge line and a slope connecting ridge line and the other valley line adjacent to the ridge line are asymmetric with respect to a straight line, which passes through the ridge line and is perpendicular to the light exit surface, and at least one set of the asymmetric portions having different shapes exists on both sides of a light source center.

In an area light source device in accordance with one or more embodiments of the present invention, in the light guide plate, a light introduction part that introduces the light from the light source through an end face and a light guide plate body, which is thinner than a maximum thickness of the light introduction part and includes the light exit surface, are continuously formed, and a proportion of a thickness of the light guide plate body to the maximum thickness of the light introduction part is less than or equal to 0.75.

A liquid crystal display device according to one or more embodiments of the present invention includes an area light source according to one or more embodiments of the present invention and a liquid crystal panel.

A mobile device according to one or more embodiments of the present invention includes an area light source device according to one or more embodiments of the present invention.

According to one or more embodiments of the present invention, because the light blocking member is provided between the end face of the light guide plate and the aperture window of the light shielding plate, the light leaking directly from the light source, the light leaking from the slope of the light guide plate, or the light, which is reflected by the slope of the light guide plate and further reflected by the lower surface of the light guide plate to leak, hardly leaks from the aperture window of the light shielding plate, and the eyespot luminescence and the bright line, which are generated at the edge of the aperture window, can be suppressed.

According to one or more embodiments of the present invention, when any one of the conditions 1 to 4 is satisfied, even if the light blocking member is provided on the lower surface side of the light shielding plate, the light blocking member is not seen through the aperture of the light shielding plate, but the quality of the area light source device can be improved.

BRIEF DESCRIPTION OF THE DRAWINGS

FIG. 8A is a sectional view illustrating an area light source device according to a first modification of the first embodiment; FIG. 8B is a view illustrating a condition 1, and also partially illustrates the area light source device in FIG. 8A;

DETAILED DESCRIPTION

Hereinafter, embodiments of the invention will be described in detail with reference to the accompanying drawings. However, the present invention is not limited to the following embodiments, but various design changes can be made without departing from the scope of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(First Embodiment)

Figure 7:
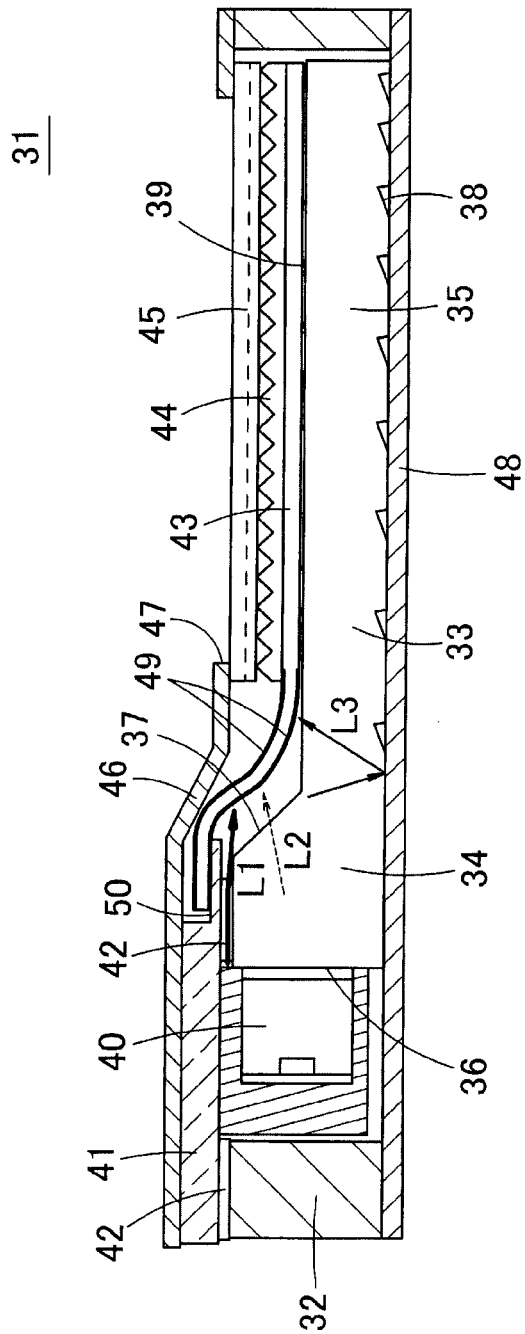
FIG. 7 is a sectional view illustrating an area light source device according to a first embodiment of the present invention.

FIGS. 7 and 8A are sectional views illustrating an area light source device 31 according to a first embodiment of the present invention. In the area light source device 31 of the first embodiment, an end portion of a diffusion sheet 43 is extended onto a light source side, a sheet-like or film-like light blocking member 49 is formed on at least one of surfaces of the extended end portion of the diffusion sheet 43, and the extended end portion is fixed to a flexible printed board 41. The light blocking member 49 may be provided on upper and lower surfaces of the diffusion sheet 43 as illustrated in FIG. 7, or the light blocking member 49 may be provided only on the lower surface of the diffusion sheet 43 as illustrated in FIG. 8.

The area light source device 31 of the first embodiment will be described below with reference to FIGS. 7 and 8A. In the area light source device 31 of the first embodiment, a light guide plate 33 is accommodated in an architrave-shape frame 32, and plural light sources 40 are disposed while facing an end face (a light incident end face 36) of the light guide plate 33. The light source 40 is provided with an LED, and mounted on the lower surface of the flexible printed board 41.

In the light guide plate 33, a light introduction part 34 is continuously and integrally molded at an end of a light guide plate body 35. The light guide plate 33 is made of high-refractive-index transparent materials, such as a polycarbonate resin, a polymethylmethacrylate (PMMA) resin, and glass. The light introduction part 34 has a maximum thickness greater than a thickness of the light guide plate body 35, and an inclined surface 37 is continuously provided in the upper surface on the light guide plate body side of the light introduction part 34 such that a step is not generated between the light introduction part 34 and the light guide plate body 35. The belt-like inclined surface 37 extends from one of side ends of the light guide plate 33 to the other side end. The light guide plate body 35 occupies most part of an area of the light guide plate 33. The upper surface of the light guide plate body 35 constitutes a light exit surface 39 through which the lighting light is output, and a light exit part, namely, many fine light deflection patterns 38 are provided in a region facing the light exit surface 39 in the lower surface of the light guide plate 33.

In FIG. 7, the light deflection pattern 38 having a triangular groove shape is illustrated as the light exit part. Alternatively, for example, a light deflection pattern formed by sandblasting, a light deflection pattern formed by photographic printing using diffusion ink, a diffraction grating pattern, and any irregular pattern may be used as the light exit part. The light exit part may be provided in the light exit surface 39 of the light guide plate body 35 or in both the light exit surface 39 and the opposite surface thereof.

The flexible printed board 41 is bonded onto the upper surfaces of the frame 32 and light introduction part 34 using a bonding agent 42 (including an adhesive). The plural light sources 40 mounted on the lower surface of the flexible printed board 41 are disposed at constant intervals in positions facing the light incident end face 36 of the light guide plate 33 (the light introduction part 34).

Plural optical sheets, namely, a diffusion sheet 43 and two prism sheets 44 and 45 are stacked on the upper surface (the light exit surface 39) of the light guide plate body 35. Many prism patterns are formed in parallel with one another on the surface of the prism sheets 44 and 45, and the prism sheets 44 and 45 are stacked such that an extending directions of the prism patterns are orthogonal to each other.

A light-source-side end portion of the diffusion sheet 43 is projected from ends of the prism sheets 44 and 45. The light-source-side end portion of the diffusion sheet 43 extends toward the light source side, and the light blocking member 49 is provided in at least one of the surfaces of the diffusion sheet 43. In FIG. 7, the light blocking members 49 are provided on the upper and lower surfaces of the diffusion sheet 43. Alternatively, as illustrated in FIG. 8A, the light blocking member 49 may be provided only on the lower surface of the diffusion sheet 43.

Figure 9A:
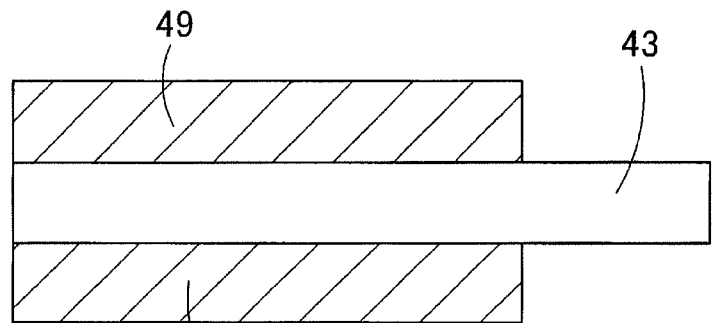
FIGS. 9A and 9B are enlarged sectional views schematically illustrating a light blocking member in the area light source device in FIG. 7.
Figure 9B:
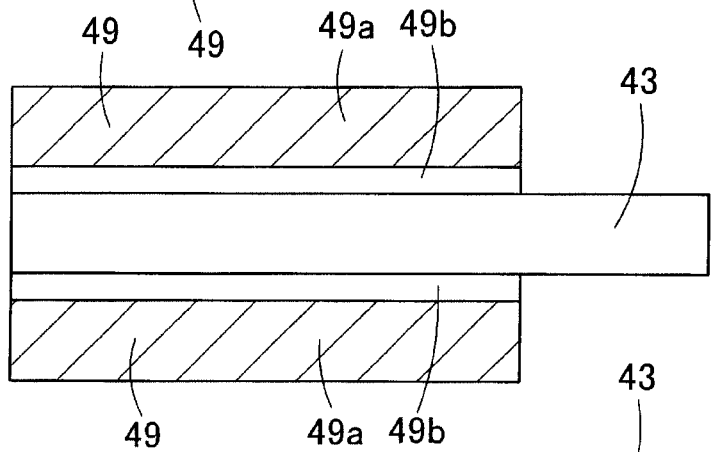

FIGS. 9A and 9B illustrate the case that the light blocking members 49 are provided on both the surfaces of the diffusion sheet 43. FIG. 9A illustrates the case that the light blocking members 49 are printed (for example, silk screen printing) on the surfaces of the diffusion sheet 43. FIG. 9B illustrates the case that the light blocking member 49 including a base material 49a and a bonding agent 49b is used. In FIG. 9B, the light blocking members 49 are bonded to the surfaces of the diffusion sheet 43 using the bonding agents 49b. In the case that the light blocking member 49 is printed as illustrated in FIG. 9A, the light blocking member 49 may be made of a monochrome material. In the case that the light blocking members 49 are bonded to the surfaces of the diffusion sheet 43 using the bonding agents 49b as illustrated in FIG. 9B, the bonding agents 49b may be made of the monochrome material, or the base materials 49a may be made of the monochrome material. As used herein, the monochrome material is a material in black, white, or gray that is of an intermediate color thereof.

Figure 9C:
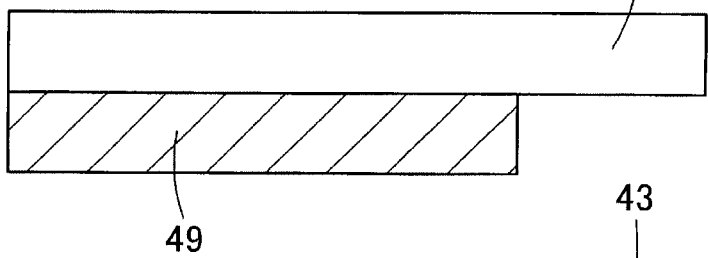
FIGS. 9C and 9D are enlarged sectional views schematically illustrating a light blocking member in the area light source device in FIG. 8A.
Figure 9D:
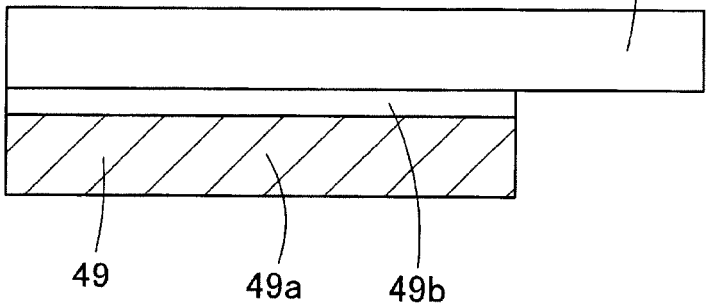

FIGS. 9C and 9D illustrate the case that the light blocking member 49 is provided only on the lower surface of the diffusion sheet 43.

On the other hand, in the upper surface in the light-guide-plate-side end portion of the flexible printed board 41, a notch 50 is provided along a width direction of the flexible printed board 41. A leading end portion of the extended portion of the diffusion sheet 43 is accommodated in the notch 50, and fixed to the upper surface of the flexible printed board 41 using the bonding agent.

A light shielding plate, namely, a rim sheet 46 is stacked on the light source 40 and the prism sheet 45, and the lower surface of the rim sheet 46 is bonded to the upper surfaces of the flexible printed board 41 and prism sheet 45. A portion corresponding to an effective emission region of the light guide plate body 35 is exposed from an aperture window 47 of the rim sheet 46. A reflecting sheet 48 is provided on the lower surface of the light guide plate 33.

In the area light source device 31, when the light emitted from the light source 40 is incident to the light introduction part 34 through the light incident end face 36, part of the light is directly incident to the light guide plate body 35, or part of the light is introduced to the light guide plate body 35 while reflected between the inclined surface 37 and the reflecting sheet 48. The light guided in the light guide plate body 35 is reflected by the light deflection pattern 38, output through the light exit surface 39, transmitted through the optical sheets 43 to 45, and evenly output upward from the aperture window 47.

Figure 1:
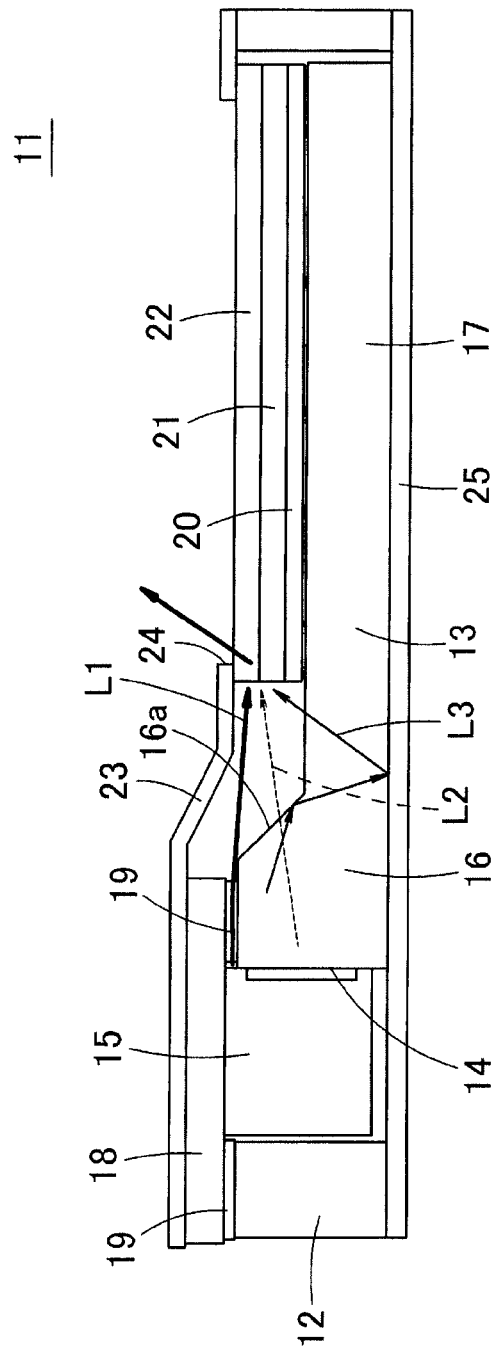
FIG. 1 is a schematic sectional view illustrating a conventional example of an area light source device.
Figure 2:
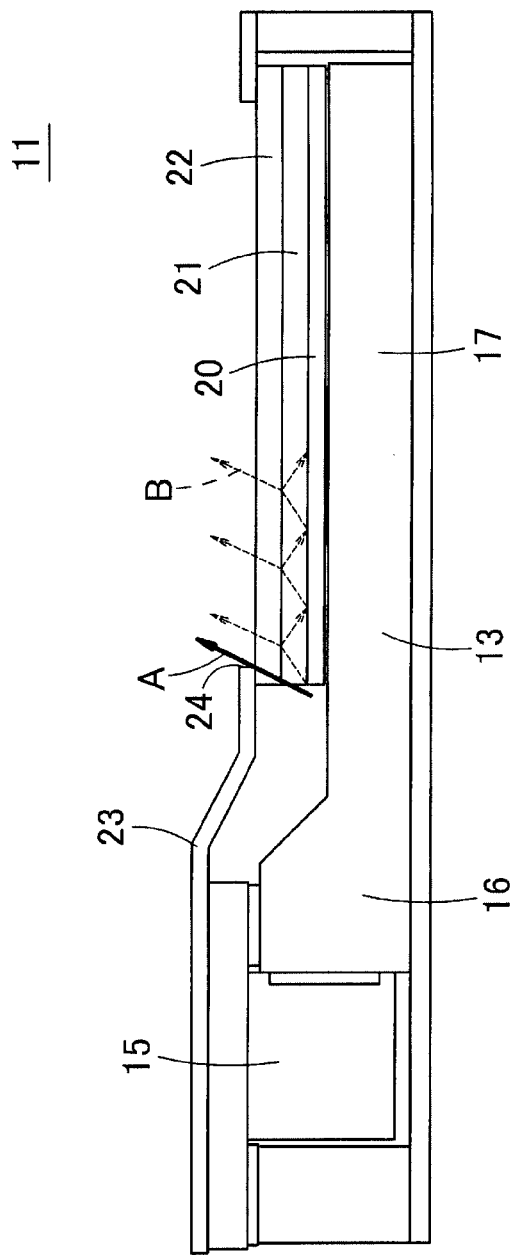
FIG. 2 is a schematic diagram illustrating a state in which eyespot luminescence or a bright line is generated in the area light source device in FIG. 1.
Figure 3:
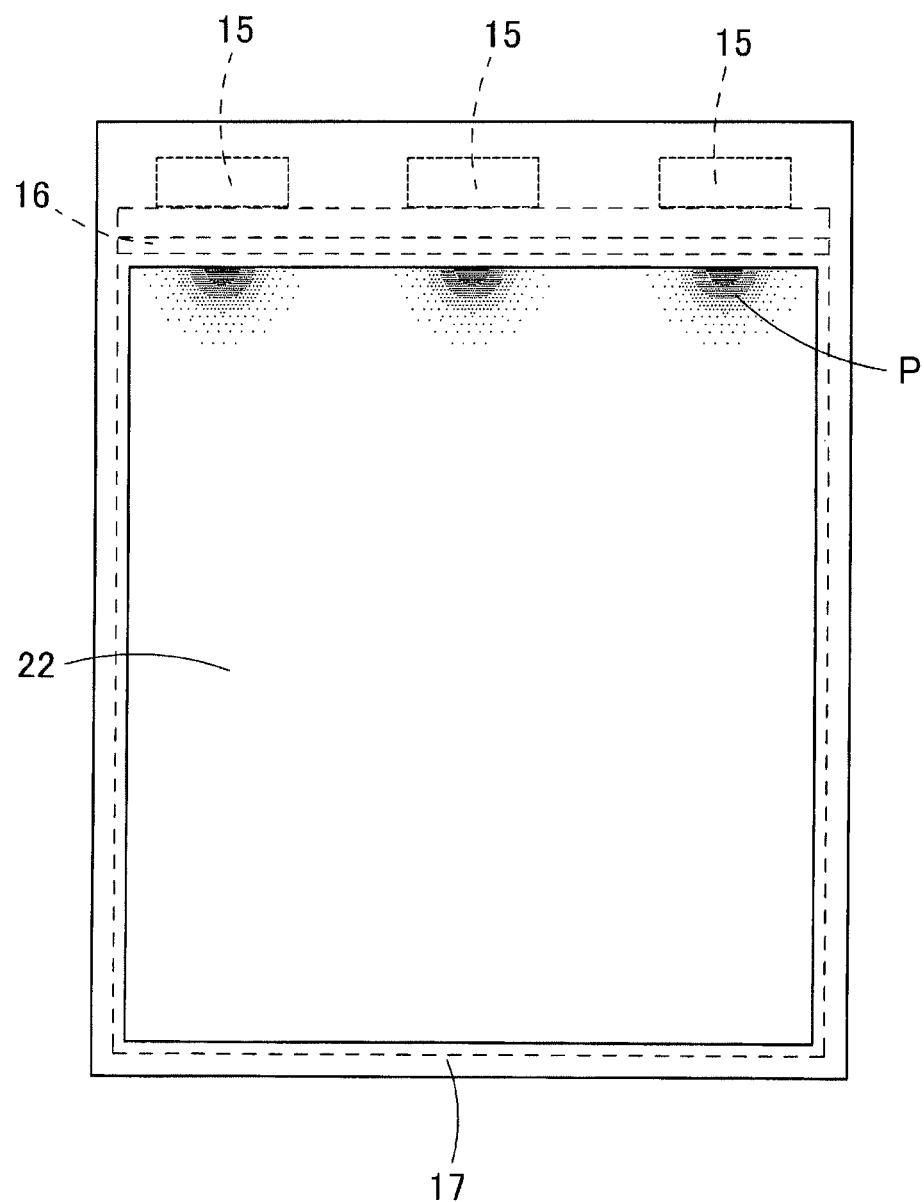
FIG. 3 is a plan view illustrating the area light source device in FIG. 1 in which the eyespot luminescence is generated.
Figure 4:
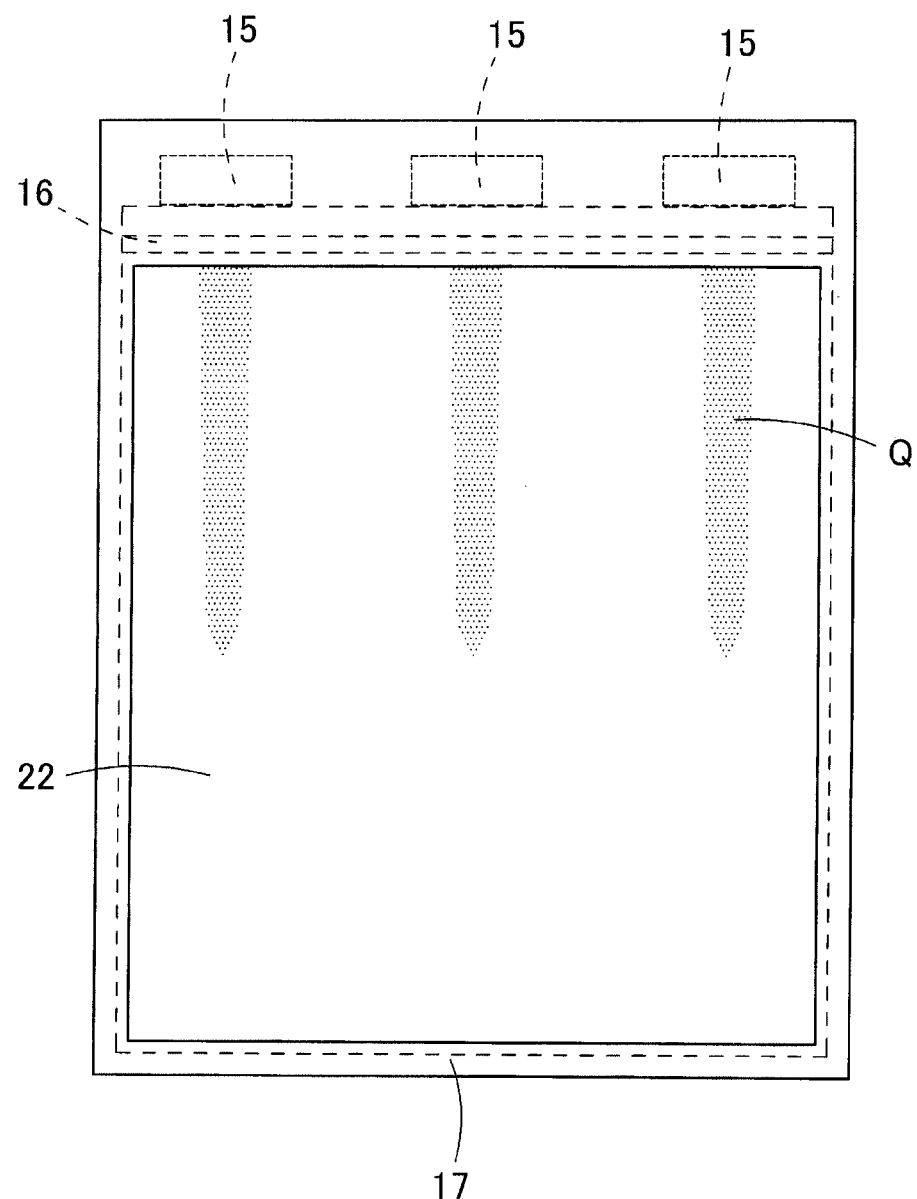
FIG. 4 is a plan view illustrating the area light source device in FIG. 1 in which the bright line is generated.
Figure 5:
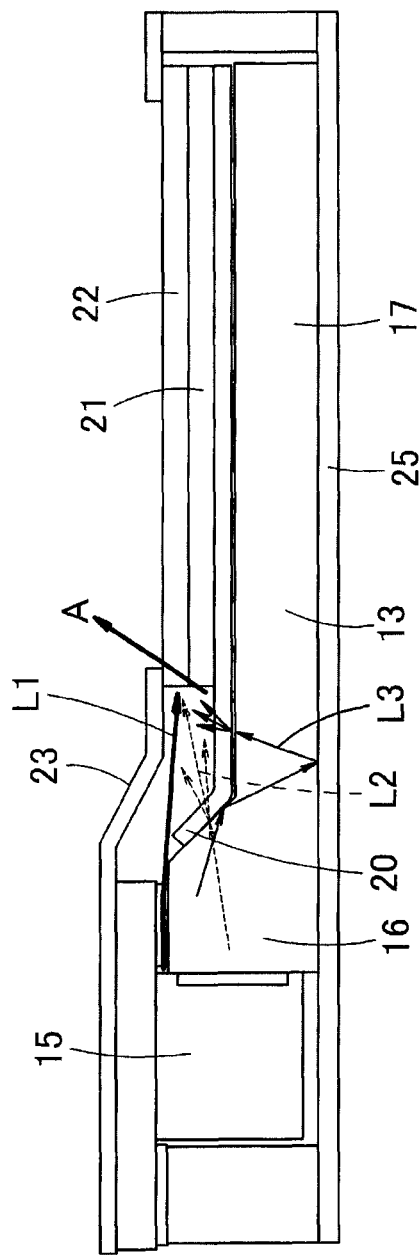
FIG. 5 is a schematic sectional view illustrating a method for decreasing leakage light in the area light source device.
Figure 6:
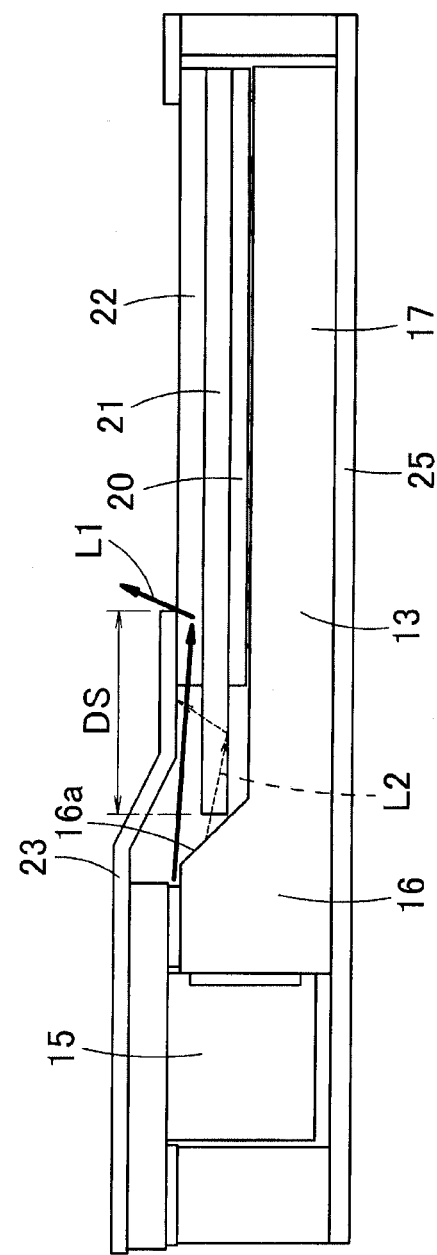
FIG. 6 is a schematic sectional view illustrating another method for decreasing the leakage light in the area light source device.

In the area light source device 31, like light L1 in FIGS. 7 and 8A, sometimes the light emitted from the light source 40 is transmitted through the bonding agent 42 to leak onto the upper surface side of the light guide plate 33. Like light L2, sometimes the light is not reflected by the inclined surface 37, but transmitted through the inclined surface 37 to leak onto the upper surface side of the light guide plate 33. Like light L3, the light is totally reflected by the inclined surface 37 and reflected by the reflecting sheet 48, and then the light leaks from the upper surface of the light guide plate body 35. As described above, the leakage light L1, the leakage light L2, and the leakage light L3 cause the eyespot luminescence P (see FIG. 3) and the bright line Q (see FIG. 4).

On the other hand, in the area light source device 31 of the first embodiment, a space between the upper surface of the light introduction part 34 and the aperture window 47 is partitioned by diffusion sheet 43, and the light blocking member 49 is provided at least one (for example, the lower surface (the surface facing the light source side) of the surfaces of the diffusion sheet 43.

Accordingly, the leakage light L1, the leakage light L2, and the leakage light L3 are absorbed or reflected by the light blocking member 49 (in the case of the printing type) or the bonding agent 49b and the base material 49a (in the case of the bonding type), and prevented from leaking from the aperture window 24. Therefore, the eyespot luminescence and the bright line due to the leakage light leaking from the aperture window 24 can be prevented.

In the case that the light blocking member 49 (or the base material 49a and the bonding agent 49b) is made of the black resin, the light L1, the light L2, and the light L3 hardly leak from the aperture window 47 because the light L1, the light L2, and the light L3 are absorbed by the light blocking member 49. On the other hand, the light blocking member 49 (or the base material 49a and the bonding agent 49b) is made of the white resin, the light L1, the light L2, and the light L3 leak possibly from the aperture window 47 because the light L1, the light L2, and the light L3 are reflected. However, the eyespot luminescence and the bright line are not generated because the light L1, the light L2, and the light L3 are scattered by the light blocking member 49. Therefore, according to one or more embodiments of the present invention, the light blocking member 49 is provided because the luminance of the area light source device 31 is improved. An intermediate situation between black and white is obtained in the case that the light blocking member 49 is in gray. In the case that the light blocking members 49 are provided on both the surfaces of the diffusion sheet 43, the diffusion sheets 43 having different colors may be provided on the upper and lower surfaces of the diffusion sheet 43. As long as at least one of the light blocking members 49 is made of the black material having the light absorbing property while the light blocking members 49 are provided on both the surfaces of the diffusion sheet 43, the light incident to the diffusion sheet 43 through the end face of the diffusion sheet 43 is guided in the diffusion sheet 43 while repeated by reflected, and the light is eventually absorbed by the light blocking member 49 having the light absorbing property.

Although the notch 50 of the flexible printed board 41 is not necessarily provided, the notch 50 can prevent the rim sheet 46 from swelling or prevent the thickness of the area light source device 31 from increasing.

As described above, in the case that the black or white light blocking member 49 is provided in the extended portion of the transparent diffusion sheet 43, possibly the light blocking member 49 is seen through the aperture window 47 of the rim sheet 46. The following condition 1 may be satisfied in order not to see the light blocking member 49 through the aperture window 47. As illustrated in FIG. 8B, it is assumed that n optical sheets are stacked on the upper surface of the light guide plate body 35, that ti is a thickness of the optical sheet (i=1, 2, . . . , n) located at an ith position from the bottom, and that Ni is a refractive index. In a direction (hereinafter referred to as a horizontal direction) parallel to the light exit surface 39, a distance De is measured from the end on the side farther away from the light source 40 of the light blocking member 49 to the light-source-side aperture end (a light-exit-surface-side end edge of a portion covering the light source 40 in the rim sheet 46) of the aperture window 47. When the distance De satisfies the following expression, $$De \geq \sum_{i=1}^{n} ti \times \tan[\arcsin(1/Ni)] \quad \text{(Condition 1)}$$

(a summation of the right side is calculated for i from 1 to n, and n is the number of optical sheets)

the light blocking member 49 can be prevented from being seen through the aperture window 47. Because the light is horizontally deviated by $Si=ti \times \tan[\arcsin(1/Ni)]$ in the ith optical sheet, the light output through the end of the light blocking member 49 on the lower surface is incident to the lower surface of the rim sheet 46 while horizontally deviated by the right side ($\Sigma Si$) of the condition 1 as a whole. The condition 1 is one that the incident point is hidden behind the rim sheet 46.

Figure 10:
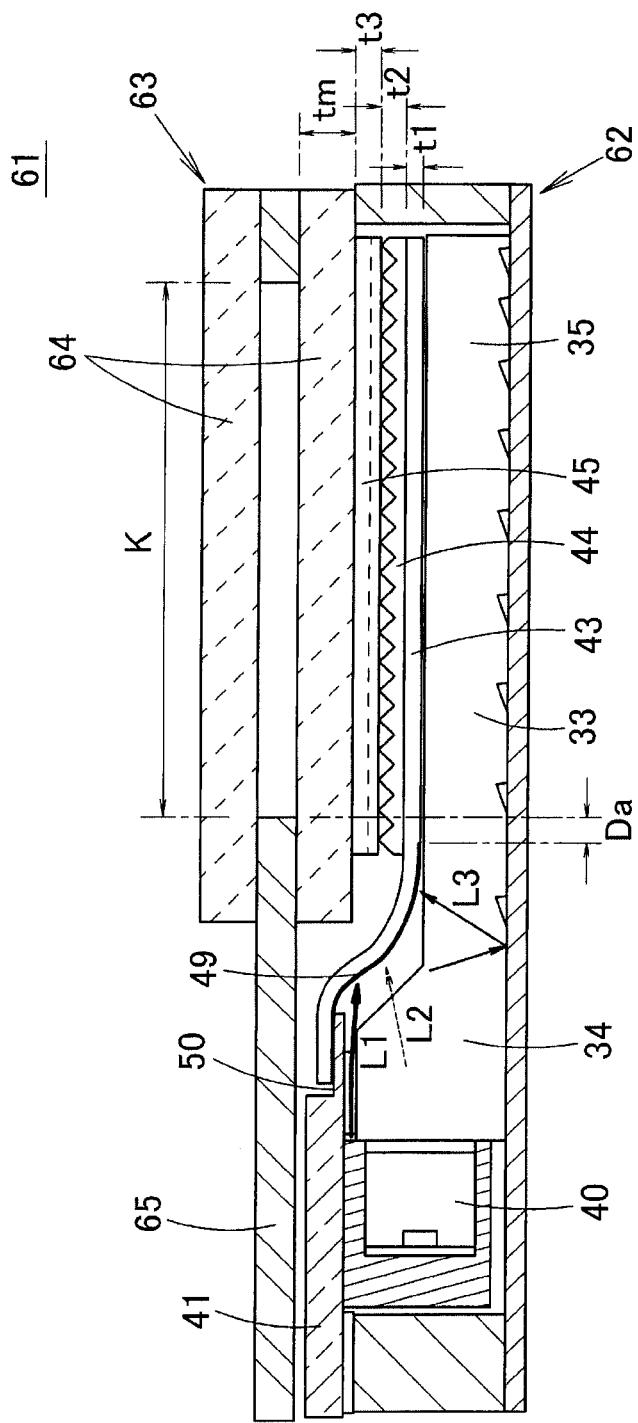
FIG. 10 is a sectional view illustrating a liquid crystal display device in which the area light source device of the first embodiment is used.

FIG. 10 illustrates a section of a liquid crystal display device 61 in which a liquid crystal panel 63 is stacked on an area light source device 62 (identical to that in FIG. 8A) of the first embodiment. In the liquid crystal panel 63, a perimeter between a pair of glass plates 64 is surrounded by a spacer 65, a liquid crystal material and electrodes are accommodated in a space (display area K) surrounded by the spacer 65, and many pixels are formed. In FIG. 10, the spacer 65 is extended to the outside of the glass plate 64 to cover the light source 40 and the light introduction part 34.

The rim sheet 46 may be eliminated in the case that the light source 40 and the light introduction part 34 are covered with the spacer 65 of the liquid crystal panel 63 as illustrated in FIG. 10.

In this case, the following condition 2 may be satisfied in order not to see the light blocking member 49 through the glass plate 64. At this point, the deviation of the light is further added by the glass plate 64 on the lower surface side until the light reaches a level at the lower surface of the spacer 65. As illustrated in FIG. 10, assuming that tm is a thickness of the glass plate 64 on the lower surface side and that Nm is a refractive index of the glass plate 64 on the lower surface side, $tm \times \tan[\arcsin(1/Nm)]$ is the deviation of the light by the glass plate 64 on the lower surface side. In the horizontal direction, a distance Da is measured from the end on the side farther away from the light source 40 of the light blocking member 49 to a display area end on a light-source-side display area in the display area K of the liquid crystal panel 63. When the distance Da satisfies the following expression, $$Da \geq \sum_{i=1}^{n} ti \times \tan[\arcsin(1/Ni)] + tm \times \tan[\arcsin(1/Nm)] \quad \text{(condition 2)}$$

(the summation of the right side is calculated for i from 1 to n, and n is the number of optical sheets)

the light blocking member 49 can be prevented from being seen through the glass plate 64.

Figure 11:
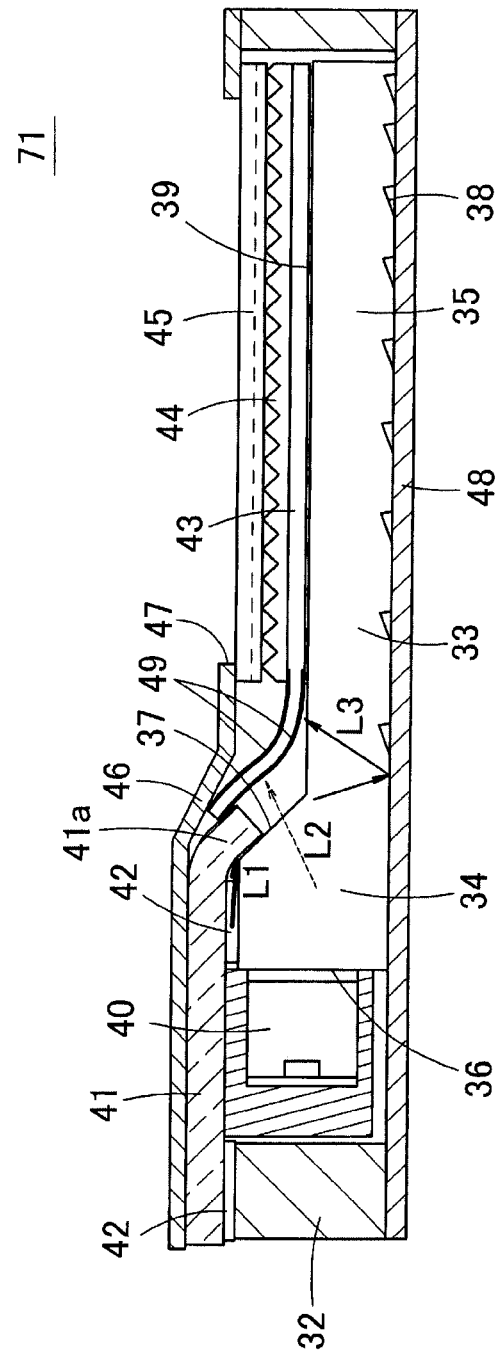
FIG. 11 is a sectional view illustrating an area light source device according to a second modification of the first embodiment.

FIG. 11 illustrates an area light source device 71 according to a modification of the first embodiment. In the area light source device 71, the light blocking member 49 is provided on at least one of the surfaces of the extended portion of the diffusion sheet 43, and the end of the extended portion of the diffusion sheet 43 is bonded and fixed to the flexible printed board 41. In the area light source device 71, the end portion of the flexible printed board 41 is curved along the inclined surface 37, and the end portion of the diffusion sheet 43 is fixed to the upper surface of the curved portion of the flexible printed board 41. The configuration of the modification of the first embodiment can prevent the rim sheet 46 from swelling due to the diffusion sheet 43, or prevent the thickness of the area light source device 71 from increasing due to the diffusion sheet 43.

(Second Embodiment)

Figure 12:
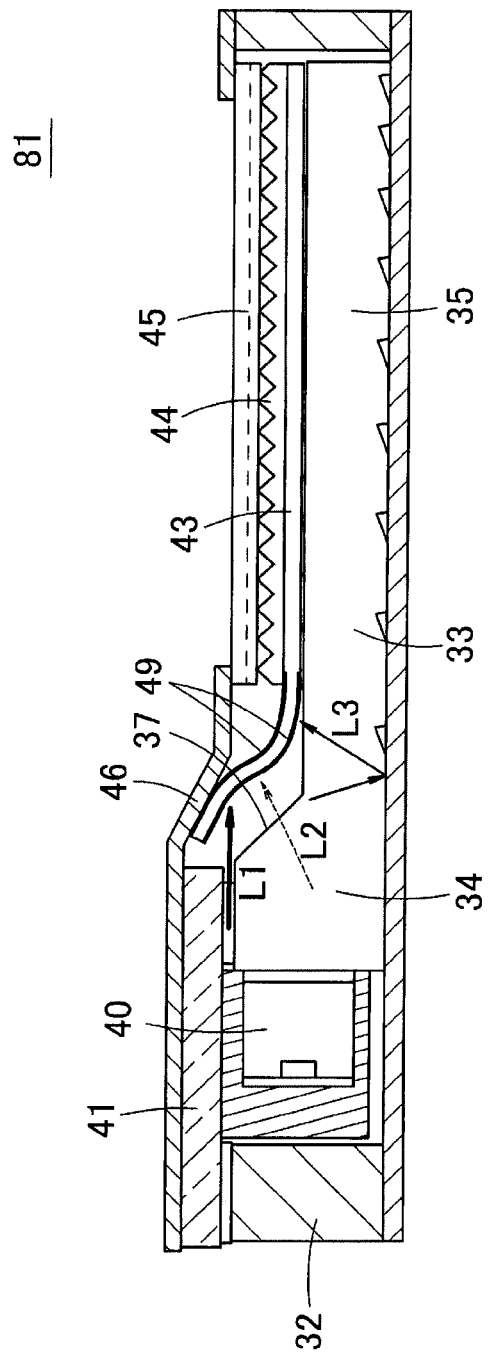
FIG. 12 is a sectional view illustrating an area light source device according to a second embodiment of the present invention.

FIG. 12 is a sectional view illustrating an area light source device 81 according to a second embodiment of the present invention. In the area light source device 81, the light blocking member 49 is provided on at least one of the surfaces of the extended portion, which is extended onto the light source side of the diffusion sheet 43, and the extended portion of the diffusion sheet 43 is bonded and fixed to the lower surface of the rim sheet 46. In the structure of the second embodiment, the space between the upper surface of the light introduction part 34 and the aperture window 47 is partitioned by the light blocking member 49, so that the eyespot luminescence and the bright line can be suppressed.

Figure 13:
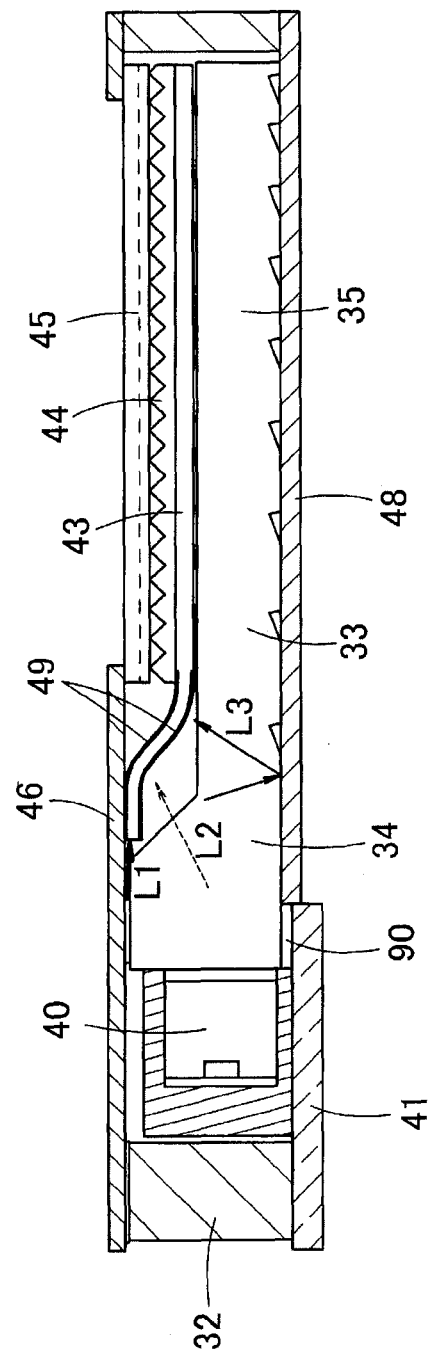
FIG. 13 is a sectional view illustrating an area light source device according to a modification of the second embodiment.

FIG. 13 is a sectional view illustrating an area light source device 83 according to a modification of the second embodiment. In the modification of the second embodiment, the light source 40 is mounted on the upper surface of the flexible printed board 41, the flexible printed board 41 is located in the lower surface of the light guide plate 33, and the light source 40 faces the light incident end face 36. In the modification of the second embodiment, the extended portion of the diffusion sheet 43 can be fixed by the similar method even if the flexible printed board 41 is located on either upper surface or the lower surface of the light source 40. In FIG. 13, the extended portion of the diffusion sheet 43 is fixed to the lower surface of the rim sheet 46. On the other hand, the flexible printed board 41 may be fixed onto the lower surface side in other embodiments.

(Third Embodiment)

Figure 14:
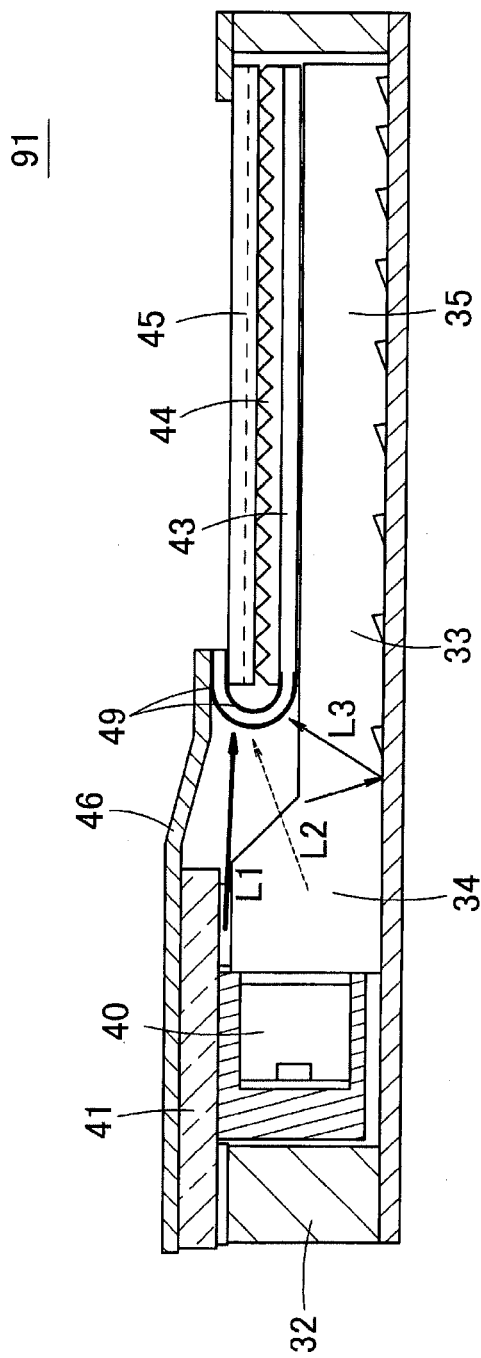
FIG. 14 is a sectional view illustrating an area light source device according to a third embodiment of the present invention.

FIG. 14 is a sectional view illustrating an area light source device 91 according to a third embodiment of the present invention. In the area light source device 91, the light blocking member 49 is provided on at least one of the surfaces of the extended portion, which is extended onto the light source side of the diffusion sheet 43, the extended portion of the diffusion sheet 43 is curved so as to be upwardly folded back, and the upper surface of the diffusion sheet 43 is fixed to the upper surface of the prism sheet 45 using the bonding agent. In the structure of the third embodiment, the space between the upper surface of the light introduction part 34 and the aperture window 47 is partitioned by the light blocking member 49, so that the eyespot luminescence and the bright line can be suppressed.

Figure 15:
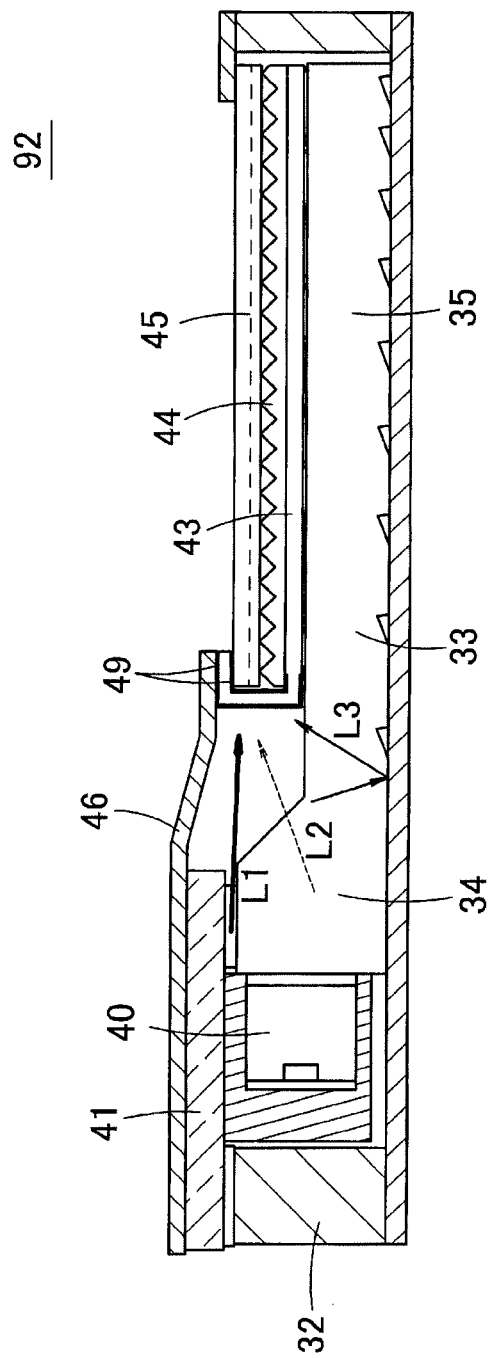
FIG. 15 is a sectional view illustrating an area light source device according to a modification of the third embodiment.

FIG. 15 is a sectional view illustrating an area light source device 92 according to a modification of the third embodiment. In the modification of the third embodiment, the extended portion of the diffusion sheet 43 is folded back into a substantially rectangular shape along the end faces of the prism sheets 44 and 45.

(Fourth Embodiment)

Figure 16:
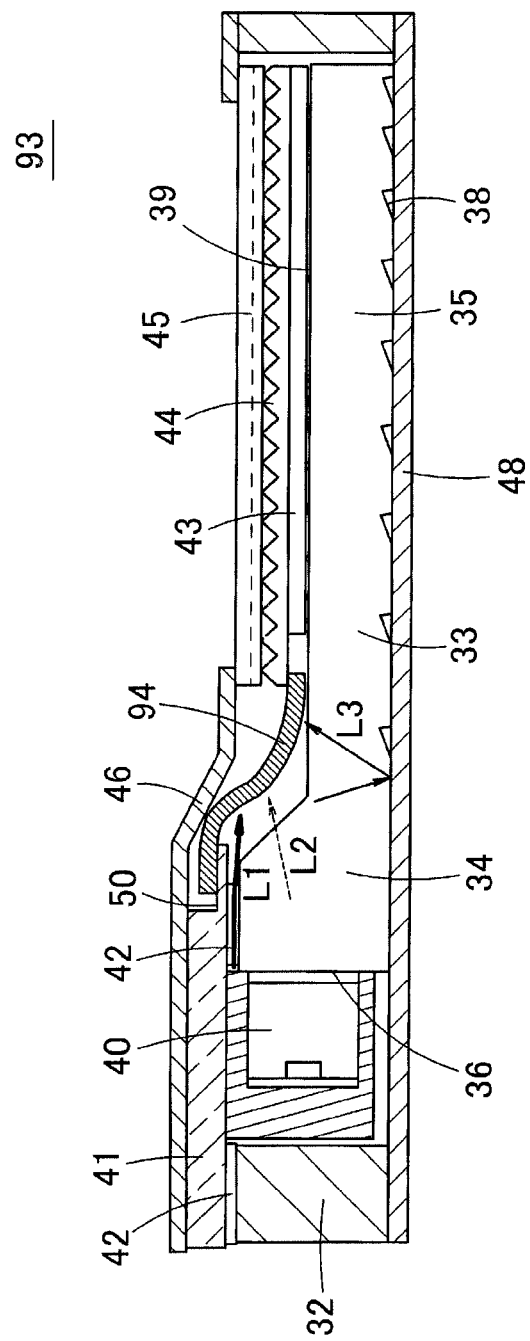
FIG. 16 is a sectional view illustrating an area light source device according to a fourth embodiment of the present invention.

FIG. 16 is a sectional view illustrating an area light source device 93 according to a fourth embodiment of the present invention. In the area light source device 93, the end on the light source side of the diffusion sheet 43 is retreated from the ends of the prism sheets 44 and 45. A sheet-like light blocking member 94 is made of a flexible black, white or gray material (a monochrome material), and the light blocking member 94 is formed independently of the diffusion sheet 43. One of the end portions of the light blocking member 94 is bonded and fixed to the notch 50 of the flexible printed board 41. The other end of the light blocking member 94 is fixed while inserted under the prism sheet 44, or bonded and fixed to the lower surface of the prism sheet 44. In the structure of the fourth embodiment, the space between the upper surface of the light introduction part 34 and the aperture window 47 is partitioned by the light blocking member 94, so that the eyespot luminescence and the bright line can be suppressed.

Figure 17:
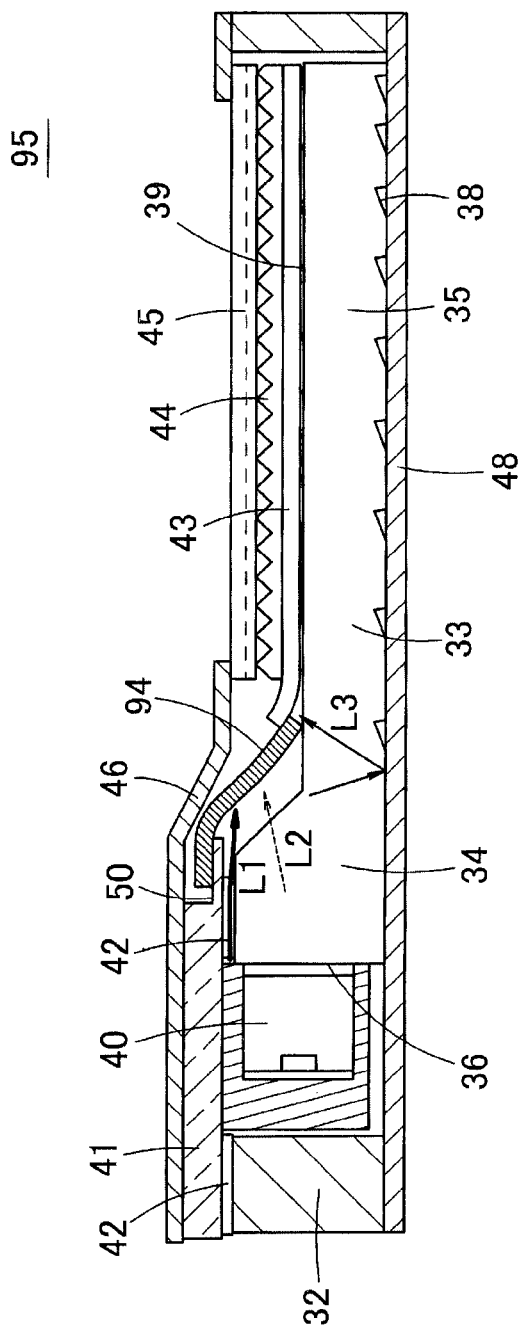
FIG. 17 is a sectional view illustrating an area light source device according to a first modification of the fourth embodiment.

FIG. 17 is a sectional view illustrating an area light source device 95 according to a first modification of the fourth embodiment. In the area light source device 95, the end portion on the light source side of the diffusion sheet 43 is projected from the ends of the prism sheets 44 and 45. One of the end portions of the light blocking member 94 is bonded and fixed to the notch 50 of the flexible printed board 41. The other end portion of the light blocking member 94 is fixed while inserted under the diffusion sheet 43, or bonded while stacked on the protruded portion of the diffusion sheet 43. In the first modification of the fourth embodiment, because the gap is not generated between the light blocking member 94 and diffusion sheet 43, the effect to suppress the leakage light is enhanced.

Figure 18:
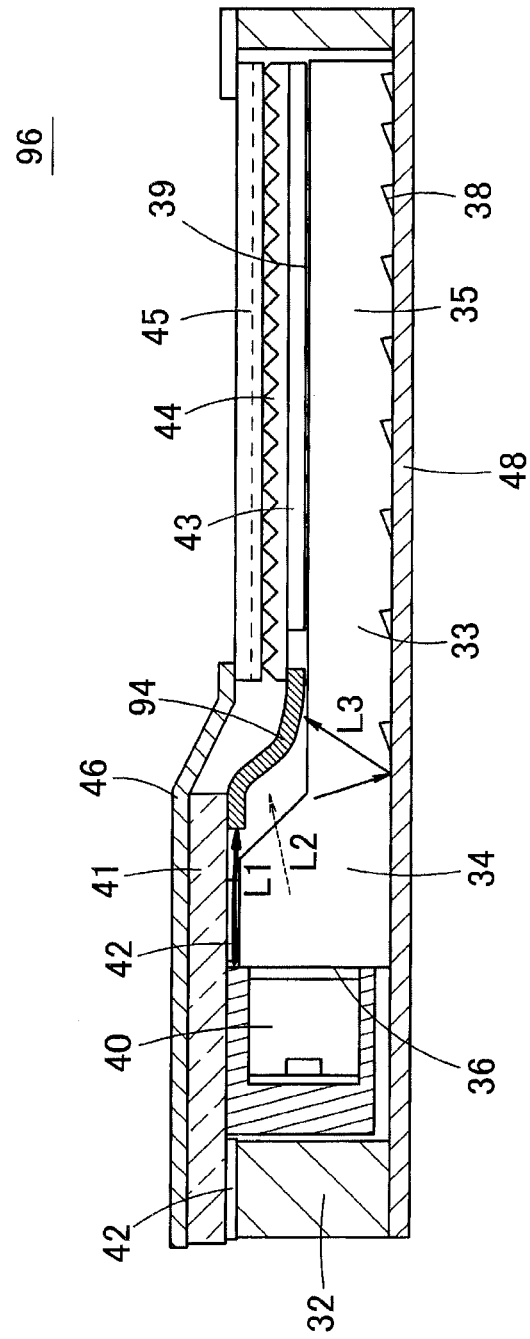
FIG. 18 is a sectional view illustrating an area light source device according to a second modification of the fourth embodiment.

FIG. 18 is a sectional view illustrating an area light source device 96 according to a second modification of the fourth embodiment. In the area light source device 96, the end on the light source side of the diffusion sheet 43 is retreated from the ends of the prism sheets 44 and 45. The sheet-like light blocking member 94 is made of the flexible black, white or gray material (the monochrome material), and the light blocking member 94 is formed independently of the diffusion sheet 43. One of the end portions of the light blocking member 94 is bonded and fixed to the lower surface of the flexible printed board 41. The other end of the light blocking member 94 is fixed while inserted under the prism sheet 44, or bonded and fixed to the lower surface of the prism sheet 44.

Figure 19:
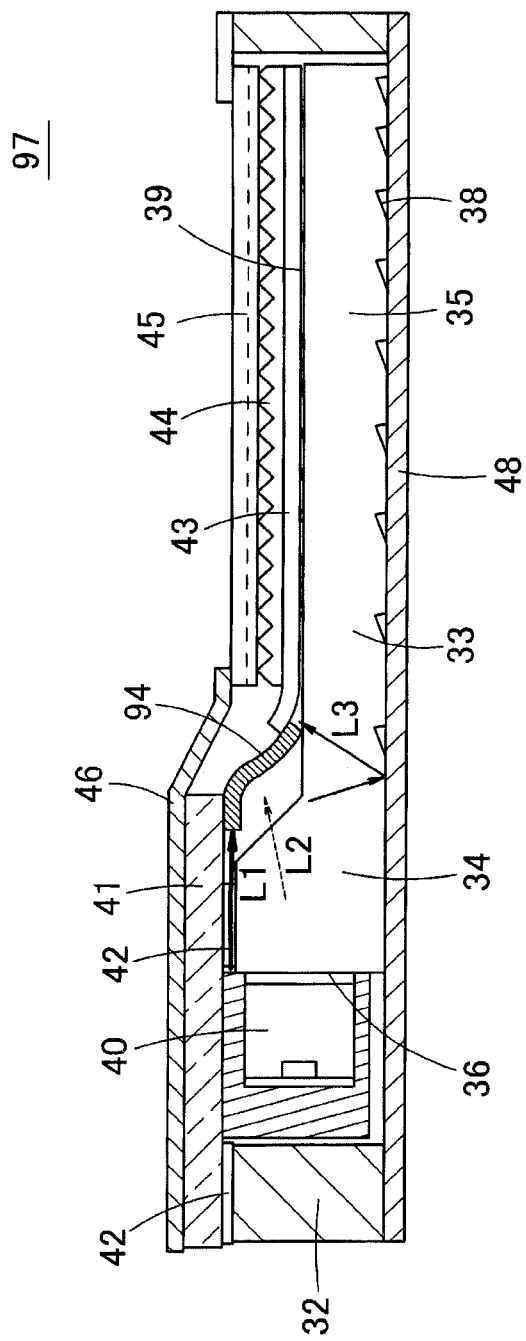
FIG. 19 is a sectional view illustrating an area light source device according to a third modification of the fourth embodiment.

FIG. 19 is a sectional view illustrating an area light source device 97 according to a third modification of the fourth embodiment. In the area light source device 97, the end portion on the light source side of the diffusion sheet 43 is projected from the ends of the prism sheets 44 and 45. One of the end portions of the light blocking member 94 is bonded and fixed to the lower surface of the flexible printed board 41. The other end portion of the light blocking member 94 is fixed while inserted under the prism sheet 44, or bonded while stacked on the diffusion sheet 43.

(Fifth Embodiment)

Figure 20:
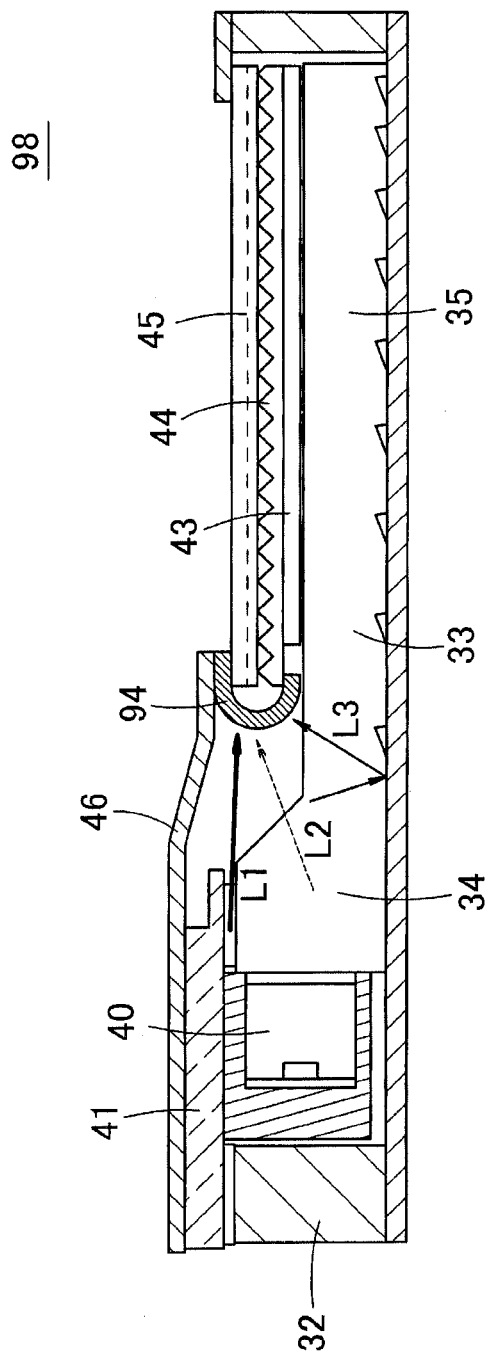
FIG. 20 is a sectional view illustrating an area light source device according to a fifth embodiment of the present invention.

FIG. 20 is a sectional view illustrating an area light source device 98 according to a fifth embodiment of the present invention. In the area light source device 98, the sheet-like light blocking member 94 is curved into an arc shape, and one of the end portions of the light blocking member 94 is fixed while inserted under the prism sheet 44, or bonded and fixed to the lower surface of the prism sheet 44. The other end portion of the light blocking member 94 is bonded and fixed to the upper surface of the prism sheet 45. In the structure of the fifth embodiment, the space between the upper surface of the light introduction part 34 and the aperture window 47 is partitioned by the light blocking member 94, so that the eyespot luminescence and the bright line can be suppressed.

Figure 21:
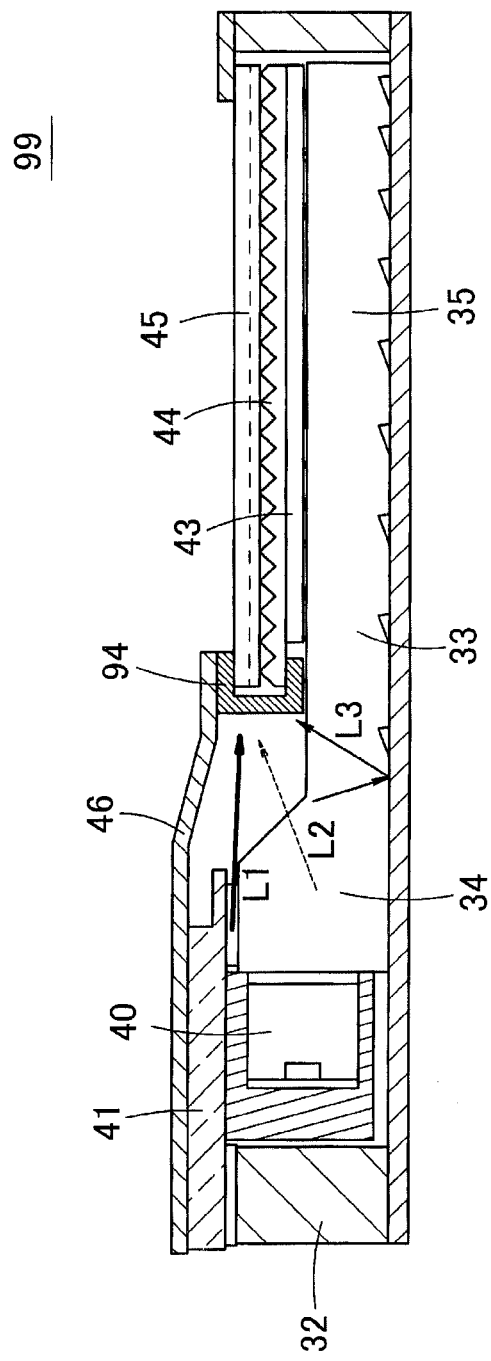
FIG. 21 is a sectional view illustrating an area light source device according to a modification of the fifth embodiment.

FIG. 21 is a sectional view illustrating an area light source device 99 according to a modification of the fifth embodiment. In the area light source device 99, the sheet-like light blocking member 94 is folded back into the rectangular shape, and one of the end portions of the light blocking member 94 is fixed while inserted under the prism sheet 44, or bonded and fixed to the lower surface of the prism sheet 44. The other end portion of the light blocking member 94 is bonded and fixed to the upper surface of the prism sheet 45.

(Sixth Embodiment)

Figure 22:
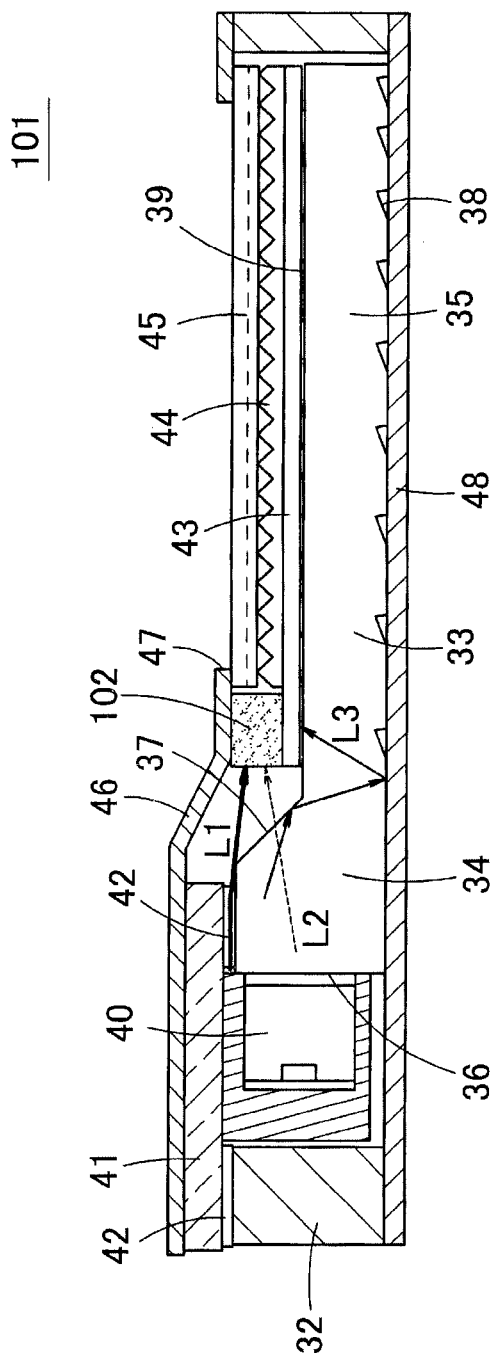
FIG. 22 is a sectional view illustrating an area light source device according to a sixth embodiment of the present invention.
Figure 23A:
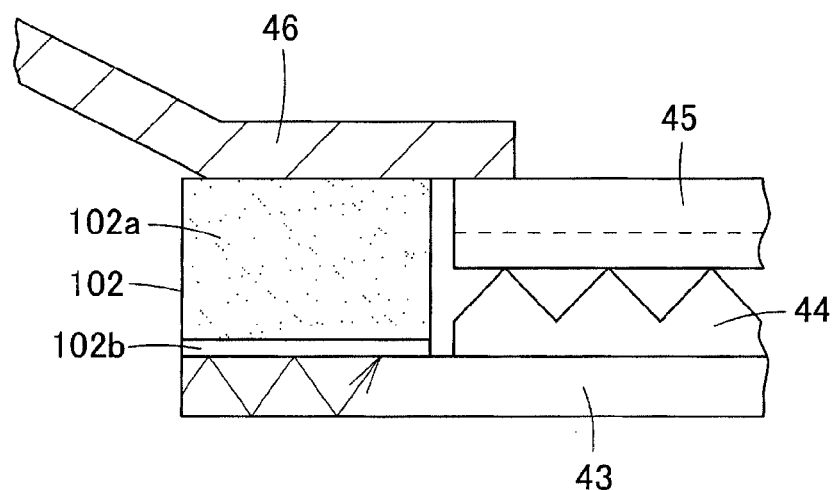
FIGS. 23A and 23B are enlarged sectional view schematically illustrating a method for fixing a light blocking member onto a diffusion sheet.
Figure 23B:
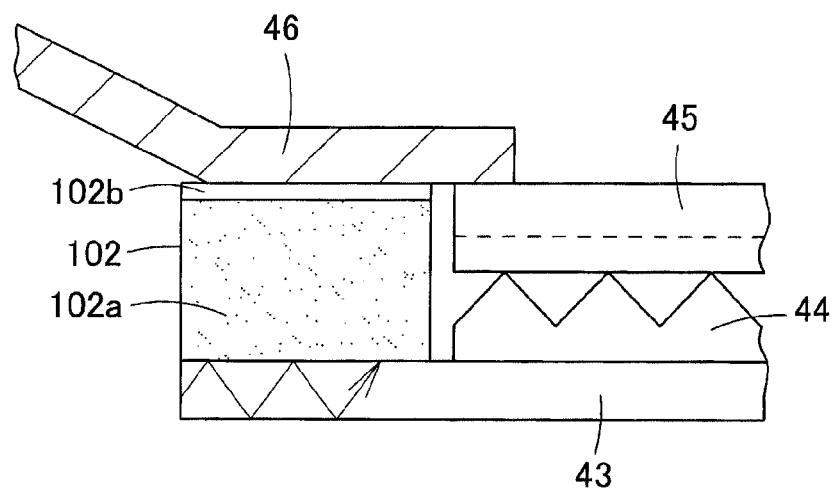

FIG. 22 is a sectional view illustrating an area light source device 101 according to a sixth embodiment of the present invention. In the area light source device 101, the end portion on the light source side of the diffusion sheet 43 is projected from the ends of the prism sheets 44 and 45, and a rod-like light blocking member 102 is provided between the lower surface of the rim sheet 46 and the upper surface of the projected portion of the diffusion sheet 43, namely, the upper surface of the diffusion sheet 43. The light blocking member 102 includes a base material 102*a* and a bonding agent 102*b*, the light blocking member 102 may be bonded to the upper surface of the diffusion sheet 43 using the bonding agent 102*b* as illustrated in FIG. 23A, and the light blocking member 102 may be bonded to the lower surface of the rim sheet 46 using the bonding agent 102*b* as illustrated in FIG. 23B. In one or more embodiments of the present invention, one of the base material 102*a* and the bonding agent 102*b*, which is in contact with the diffusion sheet 43, is made of light absorbing materials, such as the black material. The other of the base material 102*a* and the bonding agent 102*b* may be made of the white or gray material.

In the sixth embodiment, because the light blocking member is not provided on the lower surface of the diffusion sheet 43, it is necessary to modify the conditions, namely the conditions 1 and 2 in order not to see the light blocking member 102 through the aperture window 47 or the display area. In the case that the light blocking member 102 is provided on the upper surface of the diffusion sheet 43, the term related to the optical sheet of the lowermost layer may be removed from the condition 1, because the light output to the aperture window 47 through the end on the side farther away from the light source in the lower surface of the light blocking member 102 does not pass through the optical sheet (the diffusion sheet 43) of the lowermost layer. Therefore, the condition that the light blocking member 102 is not seen through the aperture window 47 becomes the following condition 3. In the condition 3, the signs and symbols are identical to those of the condition 1.

$$De \geq \sum_{i=2}^{n} ti \times \tan[\arcsin(1/Ni)] \qquad \text{(condition 3)}$$

(the summation of the right side is calculated for i from 2 to n, and n is the number of optical sheets)

In the case that the liquid crystal panel is stacked on the area light source device 101 (see FIG. 10), the condition that the light blocking member 102 is not seen through the display area of the liquid crystal panel becomes the following condition 4. In the condition 4, the signs and symbols are identical to those of the condition 2.

$$Da \geq \sum_{i=2}^{n} ti \times \tan[\arcsin(1/Ni)] + tm \times \tan[\arcsin(1/Nm)] \qquad \text{(condition 4)}$$

(the summation of the right side is calculated for i from 2 to n, and n is the number of optical sheets)

Figure 24:
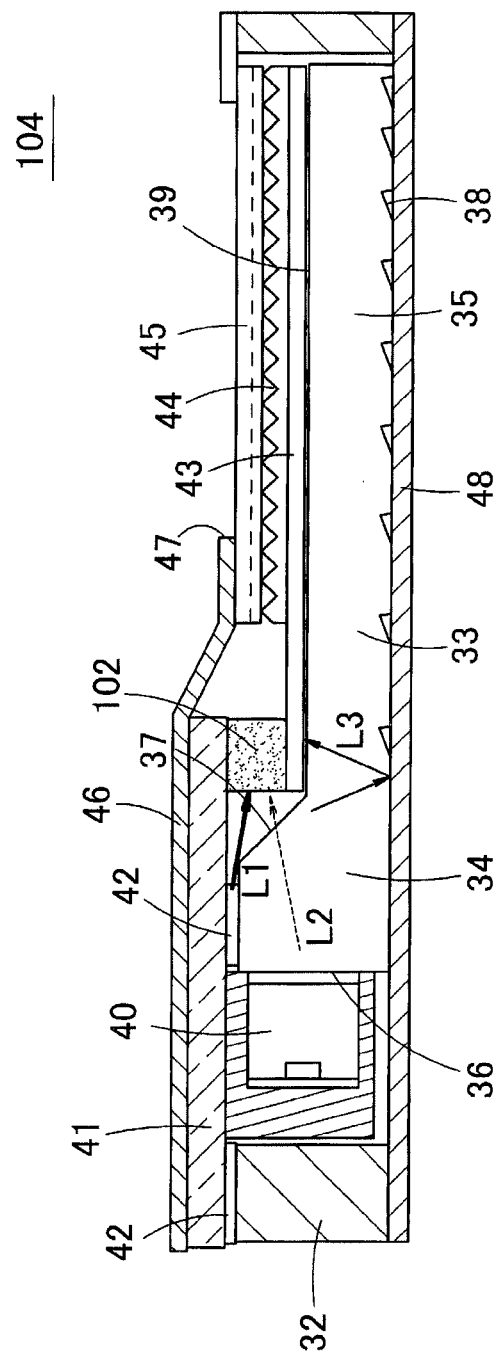
FIG. 24 is a sectional view illustrating an area light source device according to a modification of the sixth embodiment.

FIG. 24 is a sectional view illustrating an area light source device 104 according to a modification of the sixth embodiment. In the modification of the sixth embodiment, the end portion of the diffusion sheet 43 is extended onto the light source side, the flexible printed board 41 is extended to the upper surface of the light guide plate body 35, and the light blocking member 102 is bonded and fixed to the upper surface of the diffusion sheet 43 and the lower surface of the flexible printed board 41.

(Seventh Embodiment)

Figure 25:
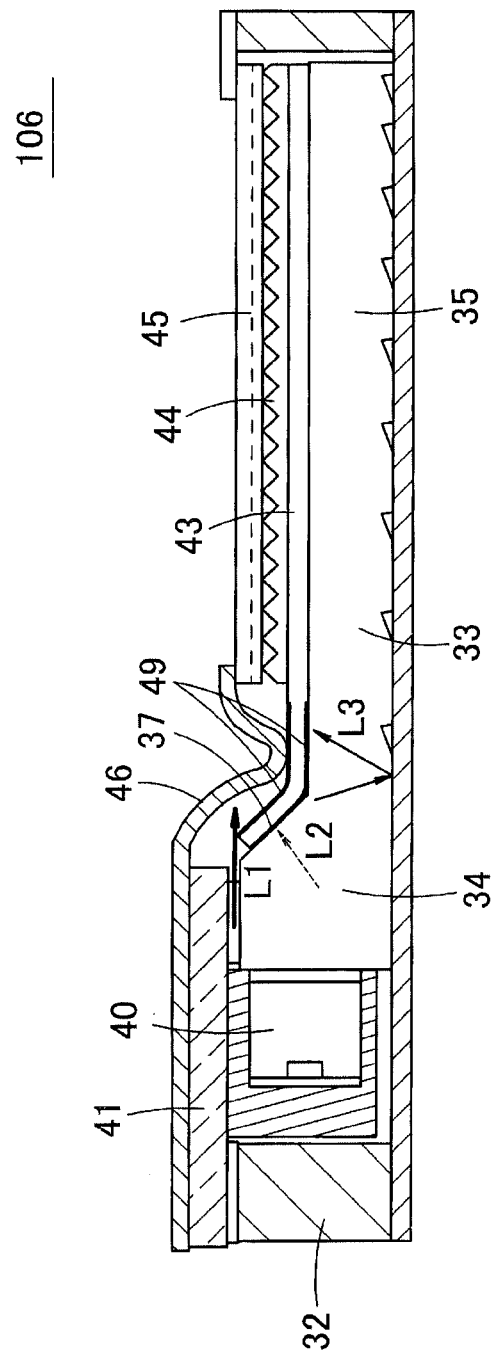
FIG. 25 is a sectional view illustrating an area light source device according to a seventh embodiment of the present invention.

FIG. 25 is a sectional view illustrating an area light source device 106 according to a seventh embodiment of the present invention. In the area light source device 106, the light blocking member 49 is provided on at least one of the surfaces of the extended portion, which is extended onto the light source side of the diffusion sheet 43, and the extended portion of the diffusion sheet 43 is provided along the inclined surface 37. The rim sheet 46 is loosened, and the lower surface of the rim sheet 46 and the upper surface of the extended portion of the diffusion sheet 43 are bonded to each other. In the structure of the seventh embodiment, the space between the upper surface of the light introduction part 34 and the aperture window 47 is partitioned by the light blocking member 49 and the rim sheet 46, so that the eyespot luminescence and the bright line can be suppressed.

(Eighth Embodiment)

Figure 26:
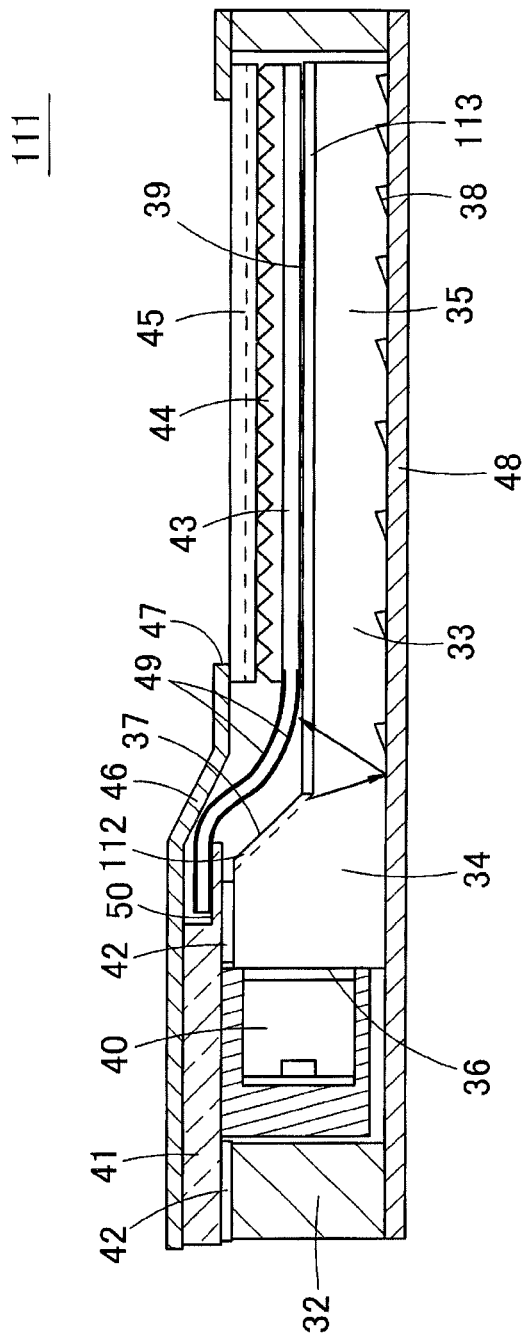
FIG. 26 is a sectional view illustrating an area light source device according to an eighth embodiment of the present invention.

FIG. 26 is a sectional view illustrating an area light source device 111 according to an eighth embodiment of the present invention. The area light source device 111 has the same structure as the first embodiment except the structure of the light guide plate 33.

Figure 27:
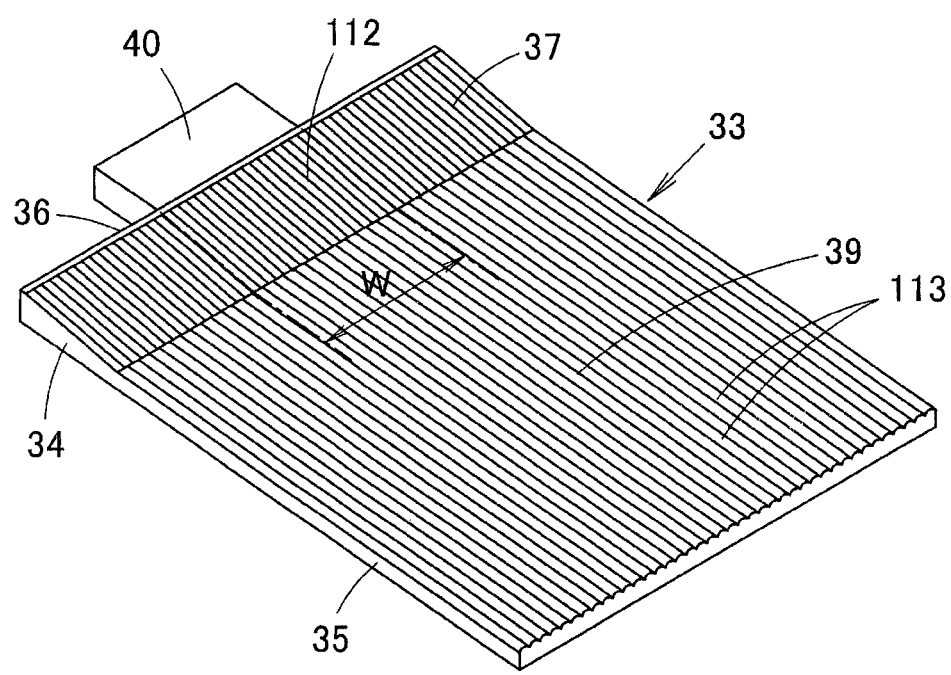
FIG. 27 is a perspective view illustrating a light guide plate used in the area light source device of the eighth embodiment.
Figure 28:
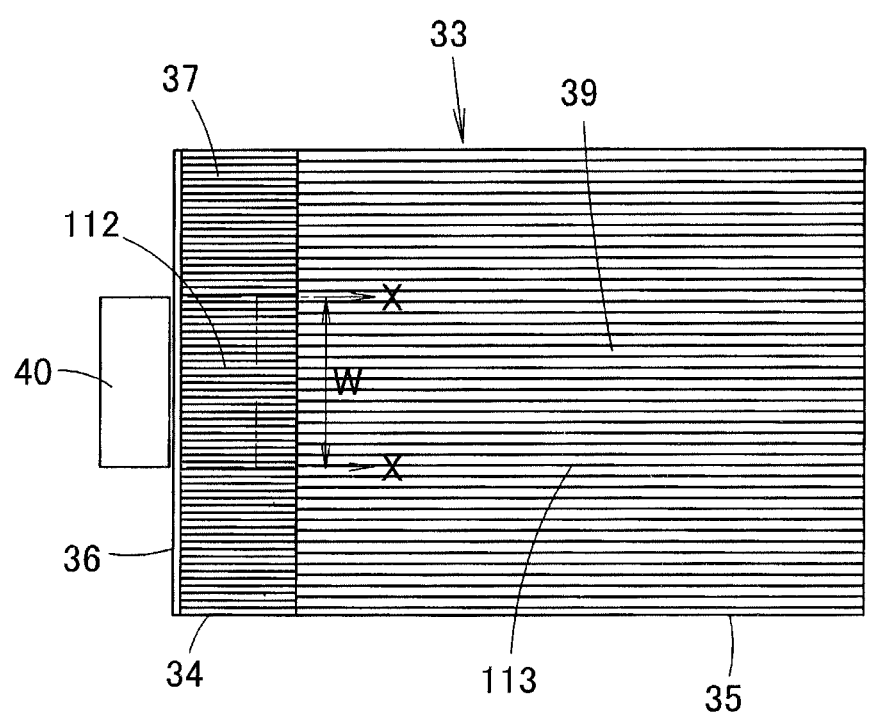
FIG. 28 is a plan view illustrating the light guide plate used in the area light source device of the eighth embodiment.

FIGS. 27 and 28 are a perspective view and a plan view illustrating the structure of the light guide plate 33 used in the area light source device 111, respectively. A directivity change pattern 112 is formed on the inclined surface 37 of the light introduction part 34. In the directivity change pattern 112, plural pattern elements having chevron or V-groove shapes are arrayed along the width direction of the light introduction part 34. That is, ridge lines and valley lines are alternately arrayed in the directivity change pattern 112. When the directivity change pattern 112 is viewed from the direction perpendicular to the light exit surface 39, the pattern elements or the ridge lines and the valley lines are disposed in parallel with the direction perpendicular to the light incident end face 36, and arrayed in parallel with one another along the width direction of the light guide plate 33. In each pattern element, a section parallel to the light incident end face 36 has an asymmetric shape. At least one set of asymmetric pattern elements having shapes different from each other exists in regions on both sides of a light source center. The directivity change pattern 112 has a function of reflecting the light incident to the light introduction part 34 to change spread of a directivity of the light incident to the light introduction part 34 in a thickness direction of the light guide plate to a directional pattern inclined to a direction parallel to a planar direction of the light guide plate 33.

A lenticular lens 113 extended in the direction perpendicular to the light incident end face 36 is formed on the upper surface (the light exit surface 39) of the light guide plate body 35.

Figure 29:
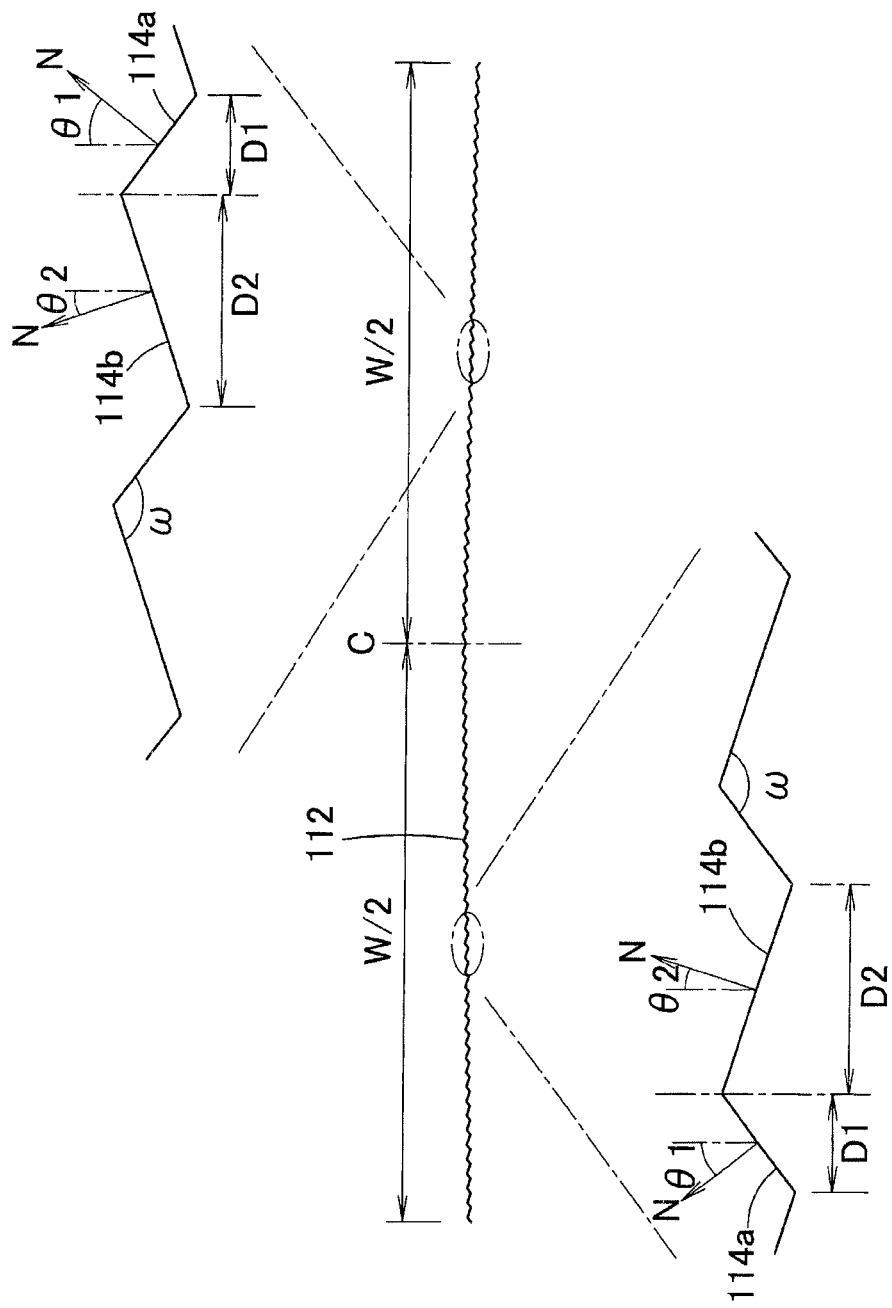
FIG. 29 is a sectional view taken on a line X-X in FIG. 28, and also partially illustrates the enlarged light guide plate.

FIG. 29 illustrates a sectional shape of the directivity change pattern 112 on a line X-X in FIG. 28. That is, FIG. 29 illustrates a portion located in a region (that is, a region having halves of a light source width W to both sides from a light source center C), which is located in front of the light source 40 and has a width (the light source width W) equal to that of the light source 40, in a section of the directivity change pattern 112 cut in parallel with the light incident end face 36. As used herein, the light source center C means a plane, which passes through an emission center 40a of the light source 40 and is perpendicular to the light incident end face 36 and light exit surface 39 of the light guide plate 33. The light source width W means not a width of a package of the light source 40, but a width of the emission surface. In FIG. 29, the directivity change pattern 112 has a symmetric shape with respect to the light source center C. However, the directivity change pattern 112 does not necessarily have the symmetric shape.

In the area light source device 111 of the eighth embodiment, the directivity change pattern 112 has the following structure or characteristic in the region of the light source width W in the section parallel to the light incident end face 36. In an outer region of the light source width W, the directivity change pattern 112 may have the same structure or characteristic as the region of the light source width W. On the other hand, a supplied light quantity and a light intensity are decreased in a region far away from the light source 40. Therefore, there is no particular limitation to the structure of the directivity change pattern 112 in the outer region of the light source width W.

In the region of the light source width W in the section parallel to the light incident end face 36, most part of or all the pattern elements constituting the directivity change pattern 112 have the asymmetric shapes. That is, a pattern slope 114a connecting a certain ridge line (a local maximum point of the section) and one of valley lines (a local minimum point of the section) adjacent to the ridge line and a pattern slope 114b connecting the ridge line and the other valley line (a local minimum point of the section) adjacent to the ridge line are asymmetric with respect to a straight line, which passes through the ridge line and is perpendicular to the light exit surface 39. However, some pattern elements (for example, the pattern element located in the light source center C) may be symmetric with respect to the straight line. As used herein, the pattern slopes 114a and 114b mean surfaces of the directivity change pattern 112, which are located between the ridge lines adjacent to each other or the valley lines adjacent to each other. In the directivity change pattern 112 in FIG. 29, the pattern slopes 114a and 114b are formed by planes. Alternatively, the pattern slopes 114a and 114b may be formed by a curved surface of a bent surface.

In the region (hereinafter referred to as a left region of the light source center C) of W/2 from the light source center C toward the left, when a normal line N is drawn in each of the pattern slopes 114a and 114b from the inside to the outside of the light guide plate 33, a summation (a total value of the widths D2 of the pattern slopes 114b in the left region having the width W/2) of widths D2 of the pattern slopes 114b in each of which the normal line N is inclined onto the light source center side is greater than a summation (a total value of the widths D1 of the pattern slopes 114a in the left region having the width W/2) of widths D1 of the pattern slopes 114a in each of which the normal line N is inclined onto the opposite side of the light source center (condition 5: $\Sigma D1 < \Sigma D2$).

Similarly, in the region (hereinafter referred to as a right region of the light source center C) of W/2 from the light source center C toward the right, when the normal line N is drawn in each of the pattern slopes 114a and 114b from the inside to the outside of the light guide plate 33, a summation (a total value of the widths D2 of the pattern slopes 114b in the right region having the width W/2) of widths D2 of the pattern slopes 114b in each of which the normal line N is inclined onto the light source center side is greater than a summation (a total value of the widths D1 of the pattern slopes 114a in the right region having the width W/2) of widths D1 of the pattern slopes 114a in each of which the normal line N is inclined onto the opposite side of the light source center (condition 5: $\Sigma D1 < \Sigma D2$).

In order to implement the condition 5, in the pattern slopes 114a and 114b (the pattern elements) adjacent to each other, the width D2 of the pattern slope 114b in which the normal line N is inclined onto the light source center side may be greater than or partially equal to the width D1 of the pattern slope 114a in which the normal line N is inclined onto the opposite side of the light source center (condition 6: D1≤D2). It is only necessary for at least some pattern elements to satisfy the condition 6 in the region of the light source width W. Although, in one or more embodiments of the present invention, the pattern elements satisfy the condition 6 as many as possible, it is not necessary for all the pattern elements to satisfy the condition 6.

Figure 30:
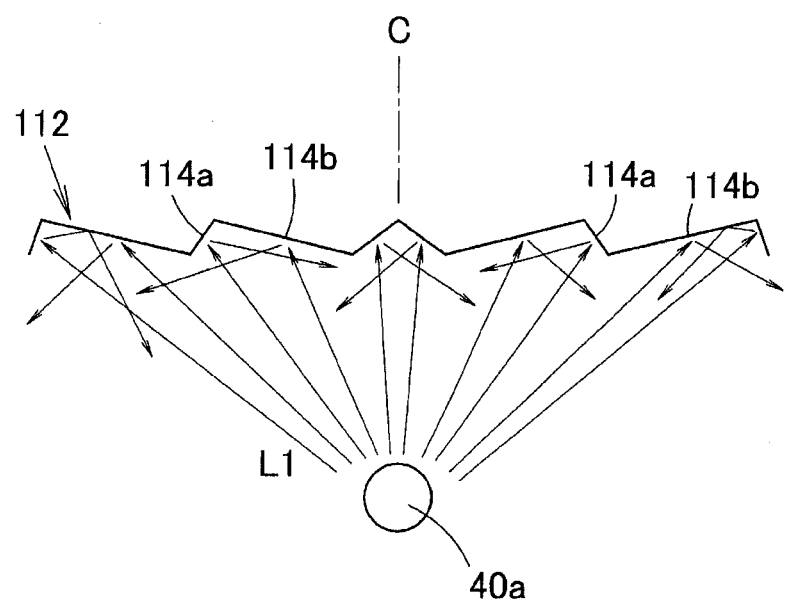
FIG. 30 is an explanatory view illustrating action of a directivity change pattern in FIG. 29.

In the area light source device 111, in each of the right and left regions of the light source center C, the summation of the widths D2 of the pattern slopes 114b in each of which the normal line N is inclined onto the light source center side is greater than the summation of the widths D1 of the pattern slopes 114a in each of which the normal line N is inclined onto the opposite side of the light source center (condition 5). Particularly, in many pattern elements, the width D2 of the pattern slope 114b in which the normal line N is inclined onto the light source center side is greater than or partially equal to the width D1 of the pattern slope 114a in which the normal line N is inclined onto the opposite side of the light source center (condition 6). As a result, as illustrated in FIG. 30, the area of the pattern slope 114a to which the light L1, which is obliquely emitted from the emission center 40a and is incident at an angle close to the perpendicularity, is reduced compared with the directivity change pattern including the symmetric pattern elements, and the light hardly leaks from the pattern slope 114a. Additionally, because the inclined angle of the pattern slope 114a in which the normal line N is inclined onto the opposite side of the light source center C is increased, the incident angle of the light L1 incident to the pattern slope 114a is increased compared with the directivity change pattern including the symmetric pattern elements, and the light L1 hardly leaks from the pattern slope 114a. As a result, in the area light source device 111, the light leaking from the directivity change pattern 112 can be prevented to improve the light use efficiency.

International Patent Application (PCT/JP2012-056182), which is applied by the inventor, discloses the main structure of the light guide plate 33 of the eighth embodiment. Although the basic structure of the light guide plate 33 in embodiments of the present invention is described, any configuration disclosed in International Patent Application (PCT/JP2012-056182) can be applied in addition to or instead of the area light source device 111 of the eighth embodiment of the present invention.

(Ninth Embodiment)

Figures 31A, 31B:
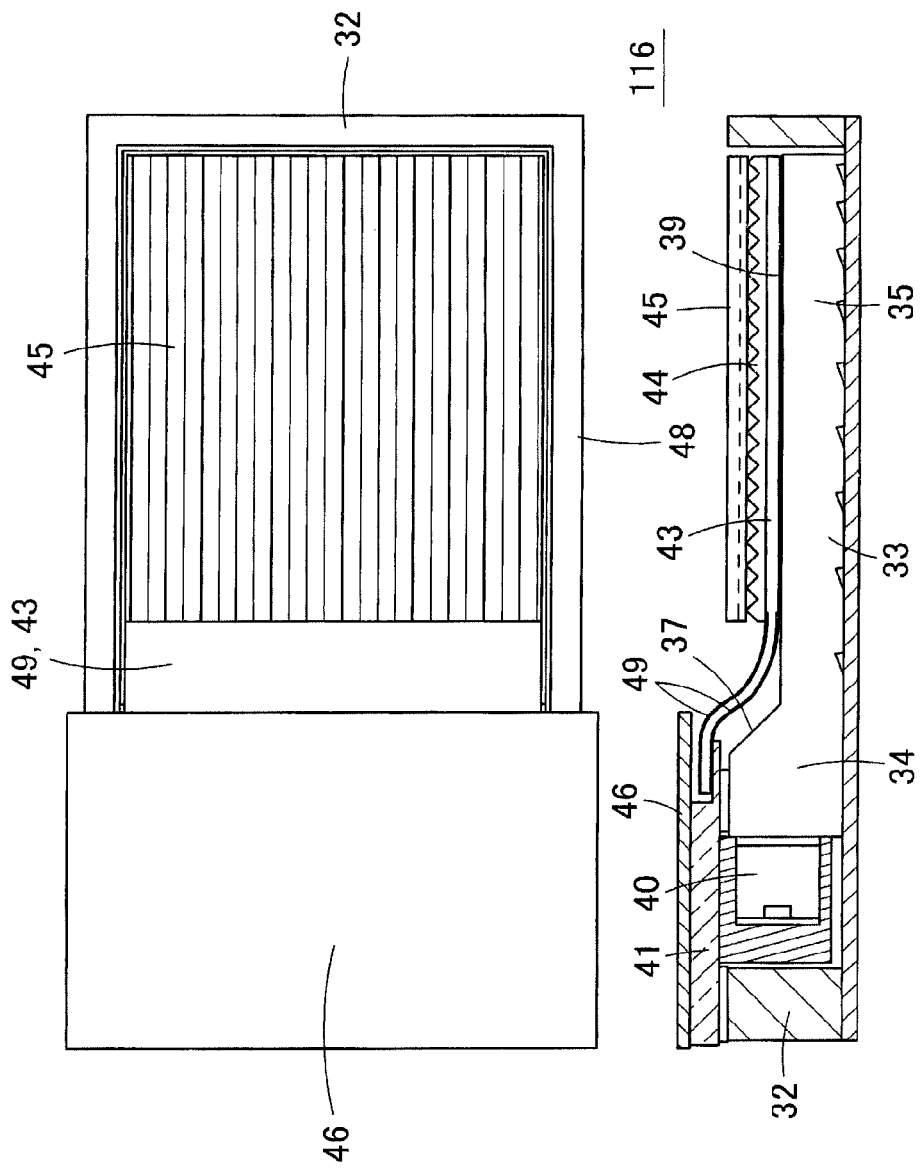
FIG. 31A is a plan view illustrating an area light source device according to a ninth embodiment of the present invention.
FIG. 31B is a sectional view illustrating the area light source device of the ninth embodiment.

FIG. 31A is a plan view illustrating an area light source device 116 according to a ninth embodiment of the present invention. FIG. 31B is a sectional view of the area light source device 116. Unlike one or more of the above embodiments, the rim sheet 46 is not limited to the frame-shaped rim sheet including the aperture window. In the area light source device 116 of the ninth embodiment, only upper portions of the light source 40 and light introduction part 34 are covered with the substantially rectangular rim sheet 46, and the light blocking member 49 having a proper structure is provided between the light incident end face 36 and the light-exit-surface-side end edge of the rim sheet 46 that covers the upper portion of the light source 40.

Figure 32:
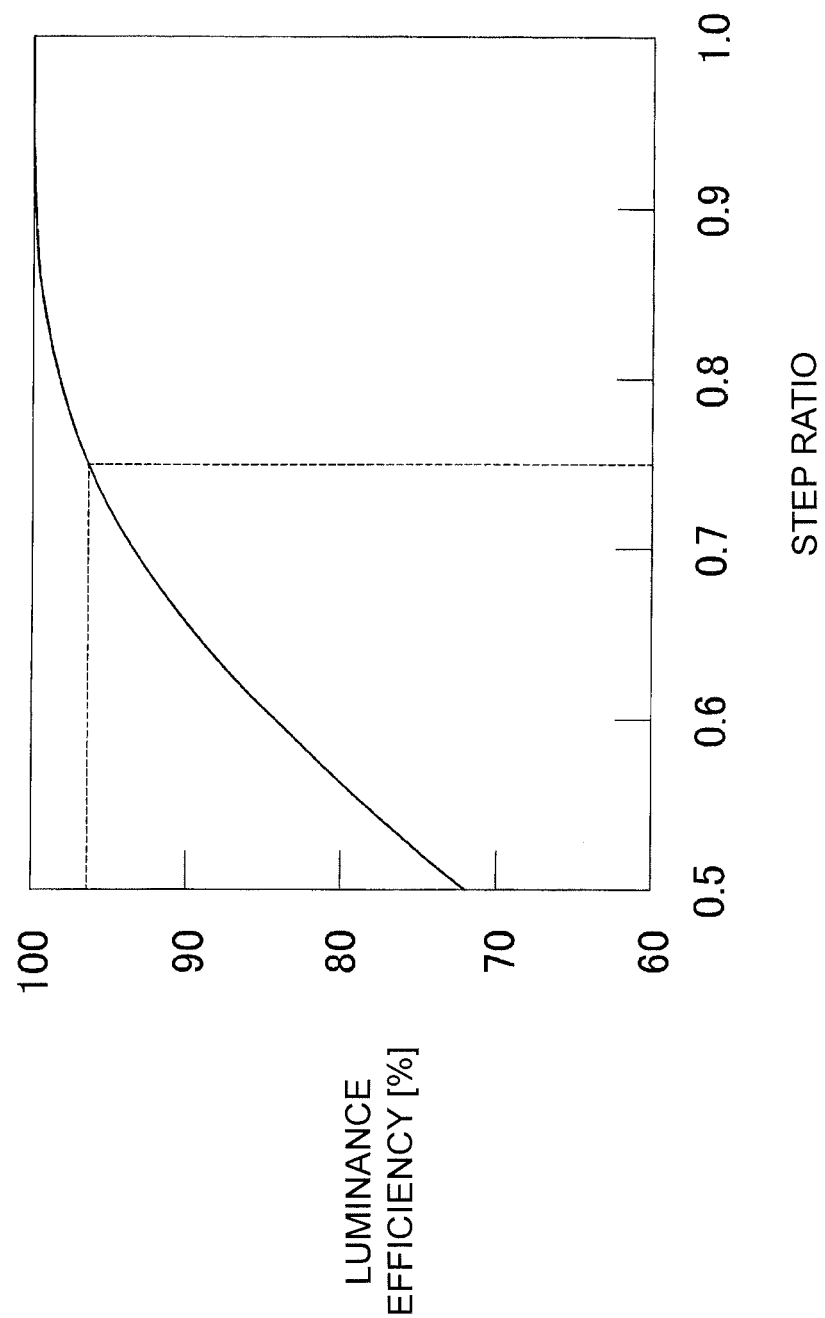
FIG. 32 is a view illustrating a relationship between a thickness proportion (a step ratio) of a light guide plate body to a light introduction part of the light guide plate and luminance efficiency of the area light source device.

FIG. 32 is a view illustrating a relationship between a thickness proportion (a step ratio) of the light guide plate body to the light introduction part and luminance efficiency of the area light source device. In the horizontal axis, the step ratio means a proportion t/T of a thickness t of the light guide plate body 35 to a maximum thickness T of the light introduction part 34. The low profile of the area light source device is further achieved with decreasing step ratio. The luminance efficiency means a percentage of how much ratio of the light output from the light exit surface 39 to the light incident to the light introduction part 34 is expressed as percent of the luminance efficiency. According to the relationship in FIG. 32, desirably the light guide plate has the step ratio of 0.75 or less because the visual quality of the area light source device is empirically degraded when the luminance efficiency is higher than 97%. Therefore, in one or more embodiments of the present invention, the step ratio is less than or equal to 0.75.

(Tenth Embodiment)

Figure 33:
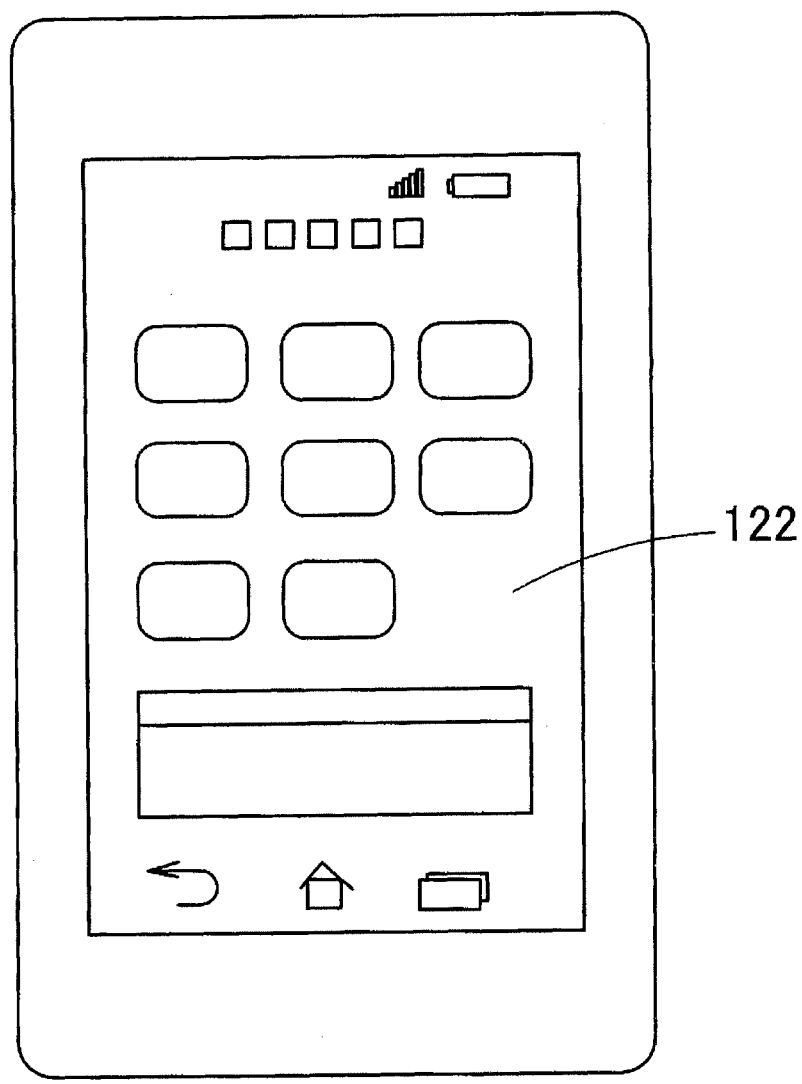
FIG. 33 is a plan view illustrating a mobile device in which the area light source device according to one or more embodiments of the present invention is used.

FIG. 33 is a plan view illustrating a mobile device, namely, a smartphone 121 in which the area light source device or liquid crystal display device according to one or more embodiments of the present invention is used. The smartphone 121 includes a liquid crystal display device 122 provided with a touch panel in a front surface. When the area light source device according to one or more embodiments of the present invention is used in the smartphone, quality of the display screen is improved because the eyespot luminescence or bright line is hardly generated. In addition to mobile phones, such as the smartphone, the area light source device according to one or more embodiments of the present invention can be applied to mobile devices, such as a tablet computer, an electronic dictionary, and an electronic book reader.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An area light source device comprising:
   a light guide plate comprising an end face and a light exit surface;
   a light source that is disposed in a position facing the end face of the light guide plate;
   a plurality of optical sheets that are disposed on the light guide plate;
   a light shielding plate that is disposed so as to cover an upper portion of the light source; and
   a light blocking member that is provided between the end face of the light guide plate and the light exit surface,
   wherein the end face of the light guide plate is configured to have light introduced therethrough,
   wherein the light exit surface of the light guide plate is configured to output the light from the light guide plate,
   wherein the light blocking member is different from the light shielding plate,
   wherein, in the light guide plate, a light introduction part that introduces the light from the light source through an end face and a light guide plate body, which is thinner than a maximum thickness of the light introduction part and includes the light exit surface, are continuously formed,
   wherein a proportion of a thickness of the light guide plate body to the maximum thickness of the light introduction part is less than or equal to 0.75, and
   wherein the plurality of optical sheets are stacked between the light shielding plate and the light blocking member, and wherein the following condition is satisfied:

$$De \geq \sum_{i=1}^{n} ti \times \tan[\arcsin(1/Ni)],$$

wherein n is the number of optical sheets, De is a distance between an end on a side farther away from the light source of the light blocking member and a light-exit-surface-side end edge of a portion covering the light source in the light shielding plate in a direction parallel to the light exit surface, ti is a thickness of the optical sheet located at an ith position from a bottom, and Ni is a refractive index of the optical sheet.

2. The area light source device according to claim 1, wherein the light blocking member is provided between the end face of the light guide plate and a light-exit-surface-side end edge of a portion covering the light source in the light shielding plate below the light shielding plate.

3. An area light source device comprising:
a light guide plate comprising: an end face and a light exit surface;
a light source that is disposed in a position facing the end face of the light guide plate;
a plurality of optical sheets that are disposed on the light guide plate; and
a light blocking member that is provided between the end face of the light guide plate and the light exit surface,
wherein the end face of the light guide plate is configured to have light introduced therethrough,
wherein the light exit surface of the light guide plate is configured to output the light from the light guide plate,
wherein the plurality of optical sheets are stacked between the light shielding plate and the light blocking member, and
wherein the following condition is satisfied:

$$Da \geq \sum_{i=1}^{n} ti \times \tan[\arcsin(1/Ni)] + tm \times \tan[\arcsin(1/Nm)],$$

wherein n is the number of optical sheets, Da is a distance between an end on a side farther away from the light source of the light blocking member and a display area end on a side of the light source in a display area of a liquid crystal panel disposed above the optical sheet in a direction parallel to the light exit surface, ti is a thickness of the optical sheet located at an ith position from a bottom, Ni is a refractive index of the optical sheet, tm is a thickness of a glass plate on a lower surface side of a liquid crystal panel, and Nm is a refractive index of the glass plate on the lower surface side of the liquid crystal panel.

4. The area light source device according to claim 1, wherein the light blocking member is formed in an end portion of at least one of surfaces of the optical sheet in a lowermost layer, and
wherein the extended end portion of the optical sheet in the lowermost layer is fixed to a wiring board on which the light source is mounted.

5. The area light source device according to claim 1, wherein the light blocking member is formed in an end portion of at least one of surfaces of the optical sheet in a lowermost layer, and
wherein the extended end portion of the optical sheet in the lowermost layer is fixed to the light shielding plate.

6. The area light source device according to claim 1, wherein the light blocking member is formed in an end portion of at least one of surfaces of the optical sheet in a lowermost layer, and
wherein the extended end portion of the optical sheet in the lowermost layer is fixed to the optical sheet in an uppermost layer.

7. The area light source device according to claim 1, wherein one of end portions of the light blocking member is fixed to a wiring board on which the light source is mounted, and the other end portion of the light blocking member is fixed to the optical sheet.

8. The area light source device according to claim 1, wherein one of end portions of the light blocking member is fixed to the optical sheet in an uppermost layer, and the other end portion of the light blocking member is fixed to the optical sheet of a lower-layer portion.

9. The area light source device according to claim 1, wherein an end portion of the optical sheet in a lowermost layer is extended onto a side of the light source from an end of the other optical sheet, and the light blocking member is provided on an upper surface of the optical sheet in a lowermost layer.

10. The area light source device according to claim 9, wherein an upper surface of the light blocking member is fixed to a lower surface of the light shielding plate.

11. The area light source device according to claim 9, wherein an upper surface of the light blocking member is fixed to a lower surface of a wiring board on which the light source is mounted.

12. The area light source device according to claim 9, wherein the plurality of optical sheets are stacked between the light shielding plate and the light blocking member, and
wherein the following condition is satisfied:

$$De \geq \sum_{i=2}^{n} ti \times \tan[\arcsin(1/Ni)],$$

wherein n is the number of optical sheets, De is a distance between an end on a side farther away from the light source of the light blocking member and a light-exit-surface-side end edge of a portion covering the light source in the light shielding plate in a direction parallel to the light exit surface, ti is a thickness of the optical sheet located at an ith position from a bottom, and Ni is a refractive index of the optical sheet.

13. The area light source device according to claim 3, wherein an end portion of the optical sheet in a lowermost layer is extended onto a side of the light source from an end of the other optical sheet, and the light blocking member is provided on an upper surface of the optical sheet in a lowermost layer, and
wherein the following condition is satisfied:

$$Da \geq \sum_{i=2}^{n} ti \times \tan[\arcsin(1/Ni)] + tm \times \tan[\arcsin(1/Nm)],$$

wherein n is the number of optical sheets, Da is a distance between an end on a side farther away from the light source of the light blocking member and a display area end on a side of the light source in a display area of a liquid crystal panel disposed above the optical sheet in a direction parallel to the light exit surface, ti is a thickness of the optical sheet located at an ith position from a bottom, Ni is a refractive index of the optical sheet, tm is a thickness of a glass plate on a lower surface side of a liquid crystal panel, and Nm is a refractive index of the glass plate on the lower surface side of the liquid crystal panel.

14. The area light source device according to claim 1, wherein the light guide plate includes:
- a light introduction part that confines the light incident through the end face from the light source; and
- a light guide plate body that is provided so as to be joined to the light introduction part, wherein a thickness of the light guide plate body is less than a maximum thickness of the light introduction part, wherein the light guide plate body causes a light exit part to output the confined light to an outside through a light exit surface, wherein the light introduction part includes an inclined surface in at least one of a light-exit-side surface of the light guide plate and an opposite surface of the light-exit-side surface, wherein the inclined surface is inclined to an end of a surface of the light guide plate body from a surface of a portion in which a thickness is greater than that of the light guide plate body, wherein the light guide plate includes a directivity change pattern in at least one of the light-exit-side surface of the light guide plate and the opposite surface of the light-exit-side surface, wherein the directivity change pattern changes spread of a directivity of the light incident to the light introduction part in a thickness direction of the light guide plate to a directional pattern inclined toward a direction parallel to a planar direction of the light guide plate, wherein the directivity change pattern is configured such that a ridge line and a valley line are alternately repeated along a width direction of the light guide plate, and wherein, among a section of the directivity change pattern cut in parallel with the end face, in a portion located in front of the light source and in a region having a width equal to that of the light source, a slope connecting any one of ridge lines of the directivity change pattern and one of valley lines adjacent to the ridge line and a slope connecting ridge line and the other valley line adjacent to the ridge line are asymmetric with respect to a straight line, which passes through the ridge line and is perpendicular to the light exit surface, and at least one set of the asymmetric portions having different shapes exists on both sides of a light source center.

15. A liquid crystal display device comprising:
the area light source device according to claim 1; and
a liquid crystal panel.

16. A mobile device comprising the area light source device according to claim 1.

17. The area light source device according to claim 3,
wherein the light blocking member is formed in an end portion of at least one of surfaces of the optical sheet in a lowermost layer, and
wherein the extended end portion of the optical sheet in the lowermost layer is fixed to a wiring board on which the light source is mounted.

18. The area light source device according to claim 3,
wherein the light blocking member is formed in an end portion of at least one of surfaces of the optical sheet in a lowermost layer, and
wherein the extended end portion of the optical sheet in the lowermost layer is fixed to the optical sheet in an uppermost layer.

19. The area light source device according to claim 3,
wherein, in the light guide plate, a light introduction part that introduces the light from the light source through an end face and a light guide plate body, which is thinner than a maximum thickness of the light introduction part and includes the light exit surface, are continuously formed, and
wherein a proportion of a thickness of the light guide plate body to the maximum thickness of the light introduction part is less than or equal to 0.75.

\* \* \* \* \*